US010275089B2

(12) United States Patent
Kim et al.

(10) Patent No.: US 10,275,089 B2
(45) Date of Patent: Apr. 30, 2019

(54) DISPLAY DEVICE AND METHOD FOR DRIVING THE SAME

(71) Applicant: LG Display Co., Ltd., Seoul (KR)

(72) Inventors: Younggyu Kim, Paju-si (KR);
Byounggwan Lee, Paju-si (KR);
Yoonnara Jang, Buan-gun (KR)

(73) Assignee: LG DISPLAY CO., LTD., Seoul (KR)

( * ) Notice: Subject to any disclaimer, the term of this patent is extended or adjusted under 35 U.S.C. 154(b) by 470 days.

(21) Appl. No.: 14/981,087

(22) Filed: Dec. 28, 2015

(65) Prior Publication Data

US 2017/0090673 A1    Mar. 30, 2017

(30) Foreign Application Priority Data

Sep. 30, 2015   (KR) .......................... 10-2015-0138258

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 3/0412* (2013.01); *G09G 2310/0297* (2013.01); *G09G 2354/00* (2013.01)

(58) Field of Classification Search
None
See application file for complete search history.

(56) References Cited

U.S. PATENT DOCUMENTS

| 5,457,474 | A | * | 10/1995 | Ikeda | G09G 3/3648 345/103 |
| 5,724,057 | A | * | 3/1998 | Kimura | G09G 3/3648 345/209 |
| 5,818,407 | A | * | 10/1998 | Hori | G02F 1/136213 345/92 |
| 5,892,494 | A | * | 4/1999 | Kimura | G09G 3/3648 345/90 |
| 5,900,854 | A | * | 5/1999 | Itoh | G09G 3/3648 345/92 |
| 6,677,925 | B1 | * | 1/2004 | Kawaguchi | G09G 3/3655 345/55 |
| 8,363,195 | B2 | * | 1/2013 | Yokoyama | G09G 3/3677 349/139 |
| 9,024,913 | B1 | * | 5/2015 | Jung | G06F 3/044 345/174 |
| 9,223,425 | B1 | * | 12/2015 | Kim | G06F 3/0412 |

(Continued)

FOREIGN PATENT DOCUMENTS

KR    10-2012-0149028 A    12/2012

*Primary Examiner* — William Boddie
*Assistant Examiner* — Bipin Gyawali
(74) *Attorney, Agent, or Firm* — Dentons US LLP

(57) ABSTRACT

A display device includes a deviation compensating circuit to receive a feedback touch driving signal from a sensor line connected to one of a plurality of touch sensor, receive a first feedback AC (alternating current) signal from a data line connected to one of a plurality of pixels, receive a second feedback AC signal from a gate line connected to the pixels, detect a phase deviation and an amplitude deviation between the feedback touch driving signal and the first and the second feedback AC signals, and generate a compensation touch driving signal, a first compensation AC signal, and a second compensation AC signal for compensating for the phase deviation and the amplitude deviation.

14 Claims, 21 Drawing Sheets

(56) References Cited

U.S. PATENT DOCUMENTS

| | | | | |
|---|---|---|---|---|
| 9,569,035 B1* | 2/2017 | Lee | | G06F 3/0416 |
| 9,619,083 B1* | 4/2017 | Kang | | G06F 3/0412 |
| 9,811,223 B2* | 11/2017 | Chen | | G06F 3/044 |
| 2002/0089477 A1* | 7/2002 | Kanbe | | G09G 3/3648 345/87 |
| 2003/0071776 A1* | 4/2003 | Choi | | G09G 3/3651 345/94 |
| 2003/0214244 A1* | 11/2003 | Onozawa | | G09G 3/2965 315/169.3 |
| 2006/0007093 A1* | 1/2006 | La | | G09G 3/3614 345/96 |
| 2006/0114209 A1* | 6/2006 | Kim | | G09G 3/3611 345/94 |
| 2006/0145995 A1* | 7/2006 | Kim | | G09G 3/3655 345/98 |
| 2008/0024411 A1* | 1/2008 | Hsieh | | G09G 3/3648 345/89 |
| 2008/0158167 A1* | 7/2008 | Hotelling | | G06F 3/0416 345/173 |
| 2008/0158178 A1* | 7/2008 | Hotelling | | G06F 3/044 345/173 |
| 2010/0245333 A1* | 9/2010 | Hsu | | G09G 3/3648 345/213 |
| 2010/0295824 A1* | 11/2010 | Noguchi | | G02F 1/13338 345/175 |
| 2011/0012844 A1* | 1/2011 | Chang | | G06F 3/0412 345/173 |
| 2011/0193820 A1* | 8/2011 | Chen | | G06F 3/0412 345/174 |
| 2011/0216039 A1* | 9/2011 | Chen | | G06F 3/0412 345/174 |
| 2011/0221983 A1* | 9/2011 | Lee | | G09G 3/3655 349/33 |
| 2011/0298746 A1* | 12/2011 | Hotelling | | G06F 3/0418 345/174 |
| 2012/0092296 A1* | 4/2012 | Yanase | | G06F 3/0416 345/174 |
| 2012/0120117 A1* | 5/2012 | Hsieh | | G09G 3/3614 345/690 |
| 2012/0162133 A1* | 6/2012 | Chen | | G06F 3/0412 345/174 |
| 2012/0162134 A1* | 6/2012 | Chen | | G06F 3/044 345/174 |
| 2012/0287107 A1* | 11/2012 | Zhao | | G09G 3/3655 345/212 |
| 2013/0076647 A1* | 3/2013 | Yousefpor | | G06F 3/0412 345/173 |
| 2013/0241873 A1* | 9/2013 | Kim | | H05K 1/0228 345/174 |
| 2013/0335342 A1* | 12/2013 | Kim | | G06F 3/044 345/173 |
| 2014/0139480 A1* | 5/2014 | Seo | | G06F 3/044 345/174 |
| 2015/0177881 A1* | 6/2015 | Chen | | G06F 3/044 345/174 |
| 2016/0012799 A1* | 1/2016 | Kim | | G09G 5/18 345/205 |
| 2016/0188115 A1* | 6/2016 | Seo | | G06F 3/0416 345/173 |
| 2016/0370922 A1* | 12/2016 | Fan | | G06F 3/0416 |
| 2016/0372025 A1* | 12/2016 | Ahn | | G09G 3/3614 |
| 2017/0090630 A1* | 3/2017 | Kim | | G06F 3/0412 |
| 2017/0102825 A1* | 4/2017 | Kim | | G06F 3/0418 |
| 2017/0147121 A1* | 5/2017 | Yang | | G06F 3/044 |
| 2017/0212636 A1* | 7/2017 | Kim | | G06F 3/0412 |

* cited by examiner

DISPLAY DEVICE AND METHOD FOR DRIVING THE SAME

CROSS REFERENCE TO RELATED APPLICATIONS

This application claims the benefit of Korea Patent Application No. 10-2015-0138258 filed on Sep. 30, 2015, which is incorporated by reference in its entirety for all purposes as if fully set forth herein.

BACKGROUND

Field of the Disclosure

The present disclosure relates to a display device, in which touch sensors are embedded in a pixel array, and a method for driving the same.

Discussion of the Related Art

A user interface (UI) is configured so that users are able to communicate with various electronic devices, and thus, can easily and comfortably control the electronic devices as they desire. Examples of a user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been essentially adopted in portable information devices, such as smart phones, and expanded to notebook computers, computer monitors, and home appliances. A technology (hereinafter referred to as "in-cell touch sensor technology") has been recently proposed to embed touch sensors in a pixel array of a display panel. In the in-cell touch sensor technology, the touch sensors may be installed in the display panel without an increase in a thickness of the display panel. The touch sensors are connected to pixels through parasitic capacitances. In order to reduce a mutual influence and crosstalk attributable to coupling between the pixels and the touch sensors, one frame period may be time-divided into a period (hereinafter referred to as "display driving period"), in which the pixels are driven, and a period (hereinafter referred to as a "touch sensor driving period"), in which the touch sensors are driven.

In the in-cell touch sensor technology, electrodes connected to the pixels of the display panel are used as electrodes of the touch sensors. For example, in the in-cell touch sensor technology, a common electrode supplying a common voltage to pixels of a liquid crystal display is segmented, and segmented common electrode patterns are used as the electrodes of the touch sensors.

A parasitic capacitance connected to the in-cell touch sensors increases due to coupling between the in-cell touch sensors and the pixels. When the parasitic capacitance increases, the possibility of crosstalk increases and touch sensitivity and accuracy of touch recognition are deteriorated. A load free driving method has been proposed to reduce an influence of the parasitic capacitance on the touch sensing by the present applicant. The load free driving method is described below with reference to FIG. 1.

Referring to FIG. 1, the load free driving method supplies AC (alternating current) signals LFD1 and LFD2 having the same phase and the same amplitude Vx as a touch driving signal Vdrv to data lines and gate lines of a display panel during a touch sensor driving period, thereby reducing an influence of a parasitic capacitance of a touch sensor on the touch sensing. More specifically, the load free driving method supplies a data voltage Vdata of an input image to the data lines and also supplies a gate pulse (including voltages VGH and VGL) synchronized with the data voltage Vdata to the gate lines during a display driving period, and supplies the AC signals LFD1 and LFD2 synchronized with the touch driving signal Vdrv to the data lines and the gate lines during the touch sensor driving period.

In the load free driving method, because the touch driving signal Vdrv and the AC signals LFD1 and LFD2 having the same phase and the same amplitude are applied to both ends of the parasitic capacitance, the influence of the parasitic capacitance may be excluded. This is because voltages at both ends of the parasitic capacitance simultaneously change, and an amount of charges charged to the parasitic capacitance decreases as a voltage difference between both ends of the parasitic capacitance decreases. According to the load free driving method, an amount of charges charged to the parasitic capacitance is theoretically zero. Therefore, a load free effect recognized as if there is no parasitic capacitance may be obtained.

The load free effect may be obtained when the touch driving signal Vdrv and the AC signals LFD1 and LFD2 have completely the same phase and the same amplitude. However, if the size of the display device increases, sizes of a connector, a cable, a printed circuit board (PCB) line, etc. may increase. Therefore, the phases and the amplitudes of the AC signals LFD1 and LFD2 may be distorted from an initial setting value. The touch driving signal Vdrv and the AC signals LFD1 and LFD2 may be distorted by several variables including a connector contact resistance, a distance difference between the cable and a metal case, etc.

Referring to FIG. 2, the phases of the AC signals LFD1 and LFD2 respectively deviate from the touch driving signal Vdrv by $\phi 1$ and $\phi 2$, and the amplitudes of the AC signals LFD1 and LFD2 deviate from the touch driving signal Vdrv by Va. As described above, when there are a phase difference and an amplitude difference between the touch driving signal Vdrv and the AC signals LFD1 and LFD2, the load free effect is reduced and variations of parasitic capacitance may cause touch detection to deteriorate.

SUMMARY

The present disclosure provides a display device and a method for driving the same capable of increasing a load free effect by receiving feedback signals of a touch driving signal and an AC (alternating current) signal and compensating for a deviation between the touch driving signal and the AC signal.

In one aspect, there is a display device comprising a display panel including a plurality of pixels for displaying an input image and a plurality of touch sensors for sensing a touch input; a deviation compensating circuit to receive a feedback touch driving signal from a sensor line connected to one of the plurality of touch sensors, receive a first feedback alternating current (AC) signal from a data line connected to one of the plurality of pixels, receive a second feedback AC signal from a gate line connected to one of the plurality of pixels, detect a phase deviation and an amplitude deviation between the feedback touch driving signal and the first and the second feedback AC signals, and generate a compensation touch driving signal, a first compensation AC signal, and a second compensation AC signal for compensating for the phase deviation and the amplitude deviation; a touch sensor driver to supply the compensation touch driving signal to the sensor lines during a touch sensor driving period, in which the touch input is sensed; and a display driver to supply the first compensation AC signal to the data line and supply the second compensation AC signal to the gate line during the touch sensor driving period.

In another aspect, there is a method for driving a display device including a display panel, including a plurality of pixels for displaying an input image and a plurality of touch sensors for sensing a touch input, the method comprising receiving a feedback touch driving signal from a sensor line connected to one of the plurality of touch sensors, receiving a first feedback alternating current (AC) signal from a data line connected to one of the plurality of pixels, receiving a second feedback AC signal from a gate line connected to one of the plurality of pixels; detecting a phase deviation and an amplitude deviation between the feedback touch driving signal and the first and the second feedback AC signals, and then generating a compensation touch driving signal, a first compensation AC signal, and a second compensation AC signal for compensating for the phase deviation and the amplitude deviation; and supplying the compensation touch driving signal to the sensor lines during a touch sensor driving period, in which the touch input is sensed, supplying the first compensation AC signal to the data line during the touch sensor driving period, and supplying the second compensation AC signal to the gate line during the touch sensor driving period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
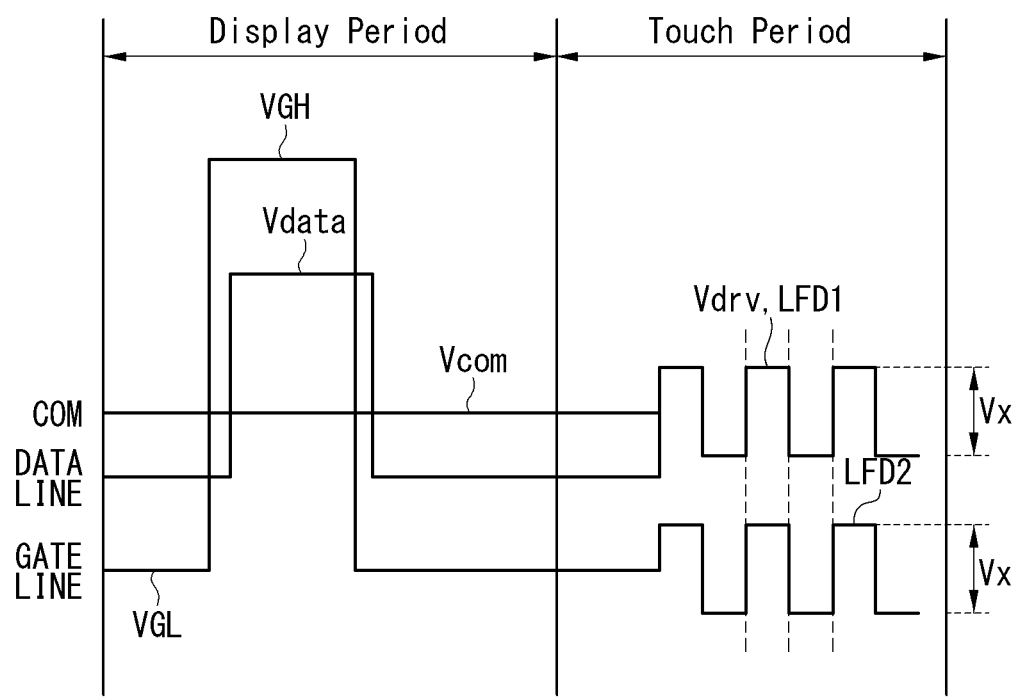
FIG. 1 shows that a touch driving signal and an AC (alternating current) signal theoretically have the same phase and the same amplitude in a related art load free driving method.
Figure 2:
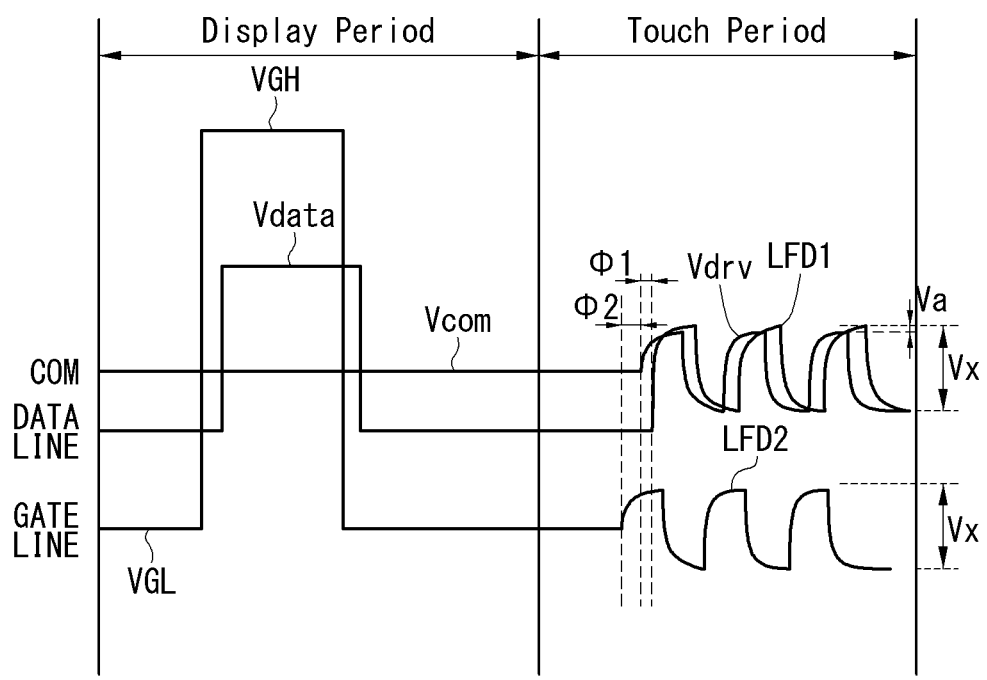
FIG. 2 shows that there are a phase difference and an amplitude difference between a touch driving signal and an AC signal in a related art load free driving method.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

FIGS. 3 to 7 illustrate a display device according to an exemplary embodiment of the invention.

Referring to FIGS. 3 to 7, a display device according to the embodiment of the invention may be implemented based on a flat panel display, such as a liquid crystal display (LCD), a field emission display (FED), a plasma display panel (PDP), an organic light emitting diode display, and an electrophoresis display (EPD). In the following description, the embodiment of the invention will be described using a liquid crystal display as an example of the flat panel display. Other flat panel displays may be used.

The display device includes a display module and a touch module.

The display module may include a display panel 10, a display driver, a timing controller TCON 16, and a host system 19.

The display panel 10 includes a liquid crystal layer formed between an upper substrate and a lower substrate. The pixel array of the display panel 10 includes pixels 101 formed in pixel areas defined by data lines D1 to Dm and gate lines G1 to Gn, where m and n are a positive integer. Each pixel 101 includes thin film transistors (TFTs) formed at crossings of the data lines D1 to Dm and the gate lines G1 to Gn, a pixel electrode charged to a data voltage, a storage capacitor which is connected to the pixel electrode and holds a voltage of a liquid crystal cell, and the like.

Black matrixes, color filters, etc. may be formed on the upper substrate of the display panel 10. The lower substrate of the display panel 10 may be configured in a COT (color filter on TFT) structure. In this instance, the black matrixes and the color filters may be formed on the lower substrate of the display panel 10. A common electrode, to which a common voltage Vcom is supplied, may be formed on the upper substrate or the lower substrate of the display panel 10. Polarizing plates are respectively attached to the upper substrate and the lower substrate of the display panel 10. Alignment layers for setting a pre-tilt angle of liquid crystals are respectively formed on the inner surfaces contacting the liquid crystals in the upper substrate and the lower substrate of the display panel 10. A column spacer is formed between the upper substrate and the lower substrate of the display panel 10 to keep cell gaps of the liquid crystal cells constant.

A backlight unit may be under a back surface of the display panel 10. The backlight unit may be implemented as one of an edge type backlight unit and a direct type backlight unit and irradiates light onto the display panel 10. The display panel 10 may be implemented in any known mode including a twisted nematic (TN) mode, a vertical alignment (VA) mode, an in-plane switching (IPS) mode, a fringe field switching (FFS) mode, etc.

The display driver includes a data driver 12 and a gate driver 14. The display driver applies digital video data RGB of an input image to the pixels 101 of the display panel 10 under the control of the timing controller 16. The data driver 12 converts the digital video data RGB received from the timing controller 16 into positive and negative analog gamma compensation voltages and outputs a data voltage. The data driver 12 then supplies the data voltage to the data lines D1 to Dm. The gate driver 14 sequentially supplies a gate pulse (or a scan pulse) synchronized with the data voltage to the gate lines G1 to Gn and selects pixel lines of the display panel 10 to which the data voltage is applied.

The timing controller 16 receives timing signals, such as a vertical sync signal Vsync, a horizontal sync signal Hsync, a data enable signal DE, and a main clock MCLK, from the host system 19. The timing controller 16 synchronizes operation timings of the data driver 12 and the gate driver 14 with each other. The timing controller 16 generates a data timing control signal and a scan timing control signal for respectively controlling the operation timings of the data driver 12 and the gate driver 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like.

The host system 19 transmits the digital video data RGB and the timing signals Vsync, Hsync, DE, and MCLK to the timing controller 16. Further, the host system 19 may execute an application associated with touch coordinate information TDATA(XY) received from a touch driving device 18.

The touch module includes touch sensors C1 to C4 and the touch driving device 18 driving the touch sensors C1 to C4.

The touch sensors C1 to C4 may be implemented as capacitive sensors sensing a touch input through a capacitive manner. The touch sensors C1 to C4 each have a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

Figure 4:
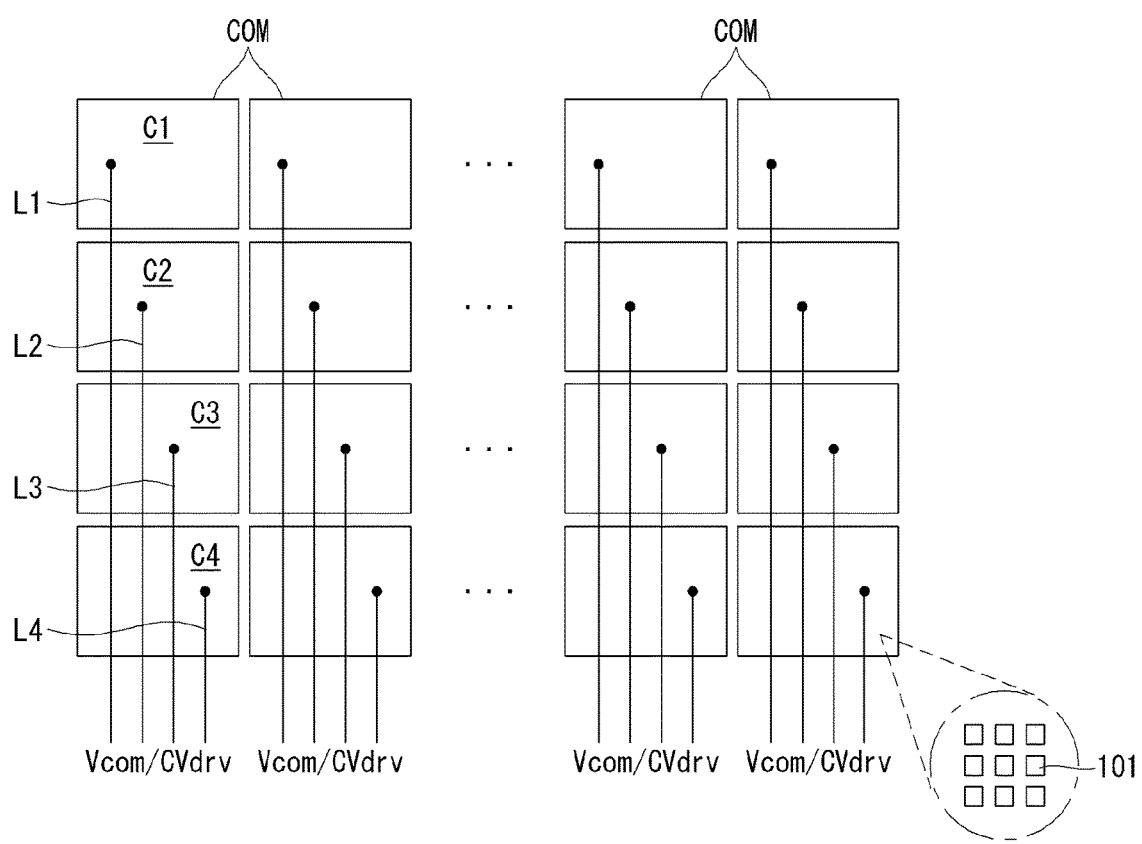
FIG. 4 illustrates an example of a touch sensor embedded in a pixel array.

As illustrated in FIG. 4, the touch sensors C1 to C4 may be embedded in the pixel array of the display panel 10. Referring to FIG. 4, the pixel array of the display panel 10 includes the touch sensors C1 to C4 and sensor lines L1 to Li connected to the touch sensors C1 to C4, where "i" is a positive integer less than m and n. A common electrode COM of the pixels 101 is divided into a plurality of segments. The touch sensors C1 to C4 are implemented as the divided common electrodes COM. One common electrode segment is commonly connected to the plurality of pixels 101 and forms one touch sensor. The touch sensors C1 to C4 supply the common voltage Vcom to the pixels 101 during display driving periods Td1 and Td2. During touch sensor driving periods Tt1 and Tt2, the touch sensors C1 to C4 receive a touch driving signal and sense a touch input. FIG. 4 shows the self-capacitance touch sensors, as an example. Other types of touch sensors may be used for the touch sensors C1 to C4.

The touch driving device 18 senses a change in charges of the touch sensors C1 to C4 before and after a touch operation and determines whether or not the touch operation using a conductive material, for example, a finger (or a stylus pen) is performed and a location of the touch operation. The touch driving device 18 analyzes the change in the charges of the touch sensors C1 to C4, determines whether or not the touch input is received, and calculates coordinates of a location of the touch input. The coordinate information TDATA(XY) of the location of the touch input is transmitted to the host system 19.

Figure 5:
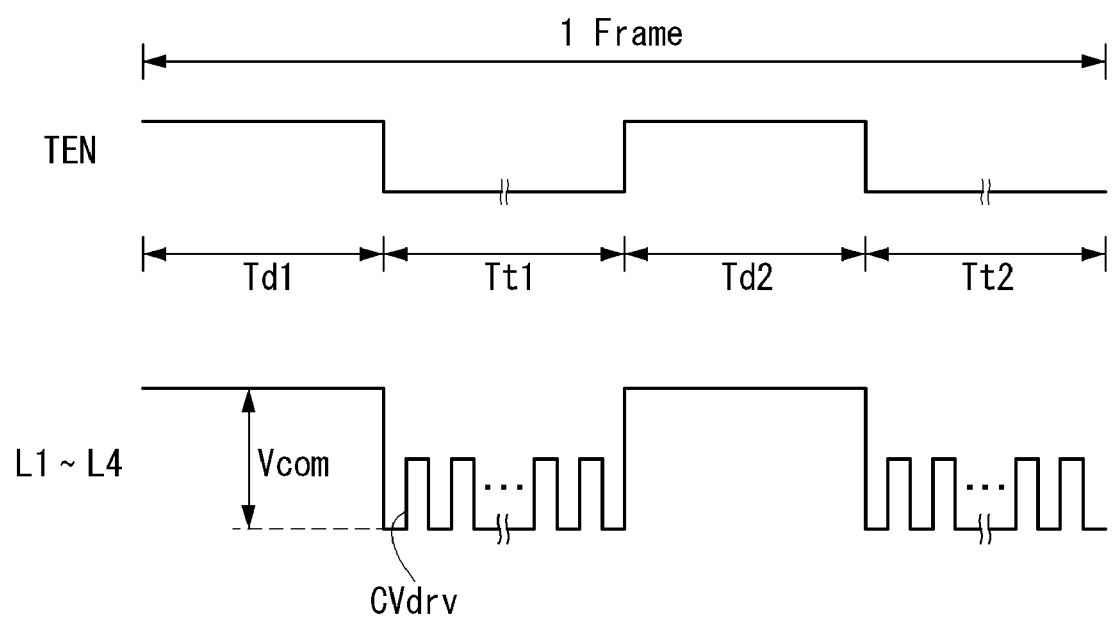
FIG. 5 is a timing diagram illustrating a method for time-division driving pixels of a display panel and touch sensors illustrated in FIG. 4.

The display device according to the embodiment of the invention time-divides one frame period into a period, in which a touch input is sensed, and a period, in which the input image is displayed. For this, as illustrated in FIG. 5, the timing controller 16 may time-divide one frame period into at least one touch sensor driving period Tt, in which the touch input is sensed, and at least one display driving period Td, in which the input image is displayed, based on a touch enable signal TEN.

During the display driving periods Td1 and Td2, the data driver 12 supplies the data voltage to the data lines D1 to Dm under the control of the timing controller 16, and the gate driver 14 sequentially supplies the gate pulse synchronized with the data voltage to the gate lines G1 to Gn under the control of the timing controller 16. During the display driving period periods Td1 and Td2, the touch driving device 18 stops a touch sensing operation.

During the touch sensor driving periods Tt1 and Tt2, the touch driving device 18 drives the touch sensors C1 to C4. The touch driving device 18 supplies the touch driving signal to the touch sensors C1 to C4 through the sensor lines L1 to Li and senses a touch input.

During the touch sensor driving periods Tt1 and Tt2, the display driver (12, 14) supplies first and second AC (alternating current) signals synchronized with the touch driving signal to the signal lines D1 to Dm and G1 to Gn connected to the pixels 101, thereby minimizing parasitic capacitances between the signal lines D1 to Dm and G1 to Gn connected to the pixels 101 and the touch sensors C1 to C4. Such a load free effect can be obtained when the touch driving signal and the first and second AC signals have completely the same phase and the same amplitude. However, if the size of the display device increases, sizes of a connector, a cable, a printed circuit board (PCB) line, etc. may increase. Therefore, the phases and the amplitudes of the touch driving signal and the first and second AC signals may be distorted from an initial setting value.

The touch driving device 18 includes a deviation compensating circuit 20 and a touch sensor driver RIC, so as to solve a problem of a synchronization deviation between the touch driving signal and the AC signals.

The deviation compensating circuit 20 receives a feedback touch driving signal Vdrv_FB from at least one of the sensor lines L1 to Li connected to the touch sensors C1 to C4, receives a first feedback AC signal LFD1_FB from at least one of the data lines D1 to Dm connected to the pixels 101, and receives a second feedback AC signal LFD2_FB from at least one of the gate lines G1 to Gn connected to the pixels 101. The deviation compensating circuit 20 detects a phase deviation and an amplitude deviation between the feedback touch driving signal Vdrv_FB and the first and second feedback AC signals LFD1_FB and LFD2_FB and then produces a compensation touch driving signal CVdrv, a first compensation AC signal CLFD1, and a second compensation AC signal CLFD2 for compensating for the phase deviation and the amplitude deviation. The deviation compensating circuit 20 supplies the compensation touch driving signal CVdrv to the touch sensor driver RIC and supplies the first compensation AC signal CLFD1 and the second compensation AC signal CLFD2 to the display driver (12, 14).

Figure 6:
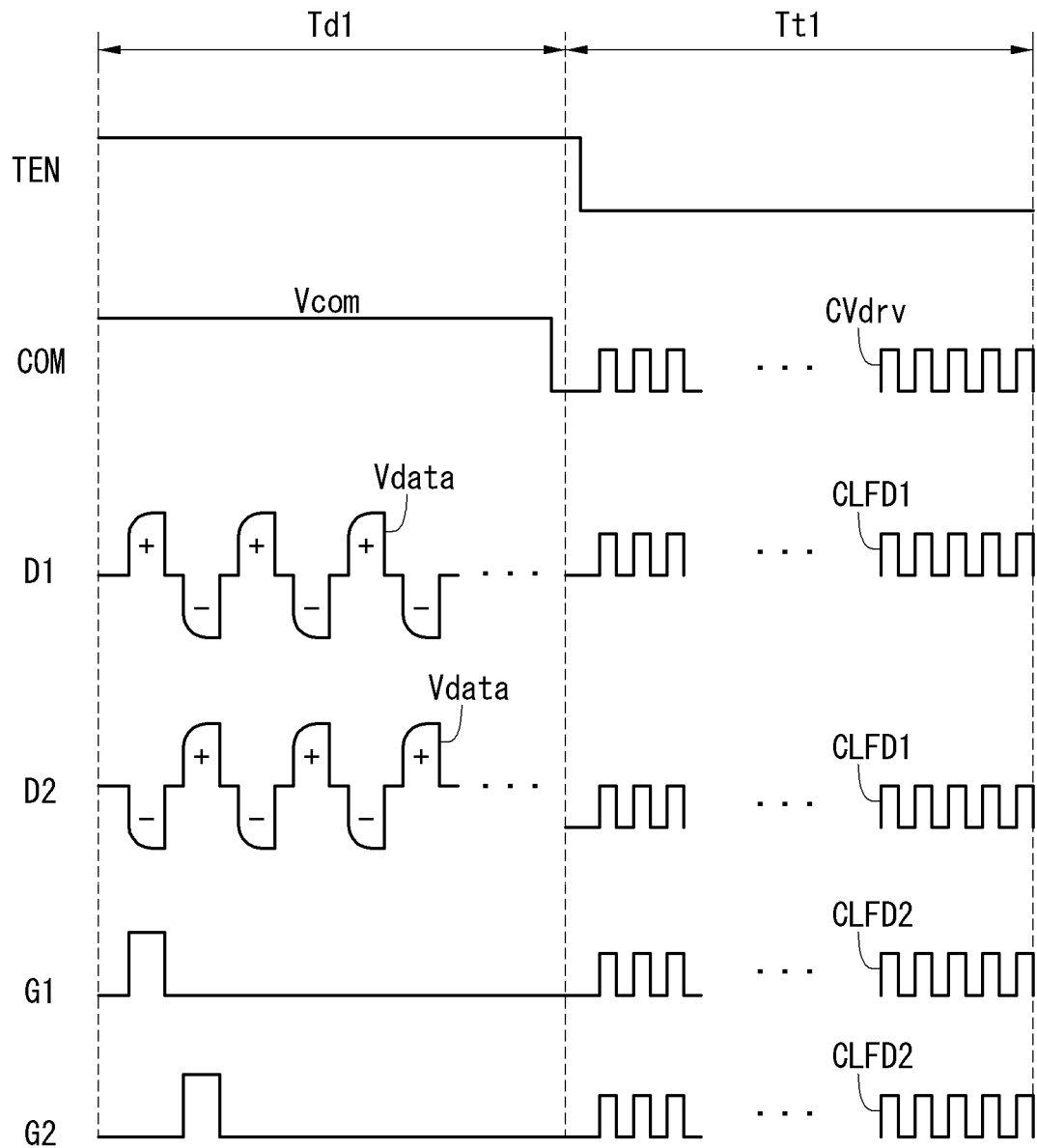
FIG. 6 is a waveform diagram illustrating signals supplied to a touch sensor, a data line, and a gate line in a display driving period and a touch sensor driving period in a time-division drive according to an exemplary embodiment of the invention.

As illustrated in FIG. 6, the touch sensor driver RIC supplies the compensation touch driving signal CVdrv to the touch sensors C1 to C4 during the touch sensor driving periods Tt1 and Tt2. As illustrated in FIG. 6, the display driver (12, 14) supplies the first compensation AC signal CLFD1 to the data lines D1 to Dm and supplies the second compensation AC signal CLFD2 to the gate lines G1 to Gn during the touch sensor driving periods Tt1 and Tt2.

Figure 7:
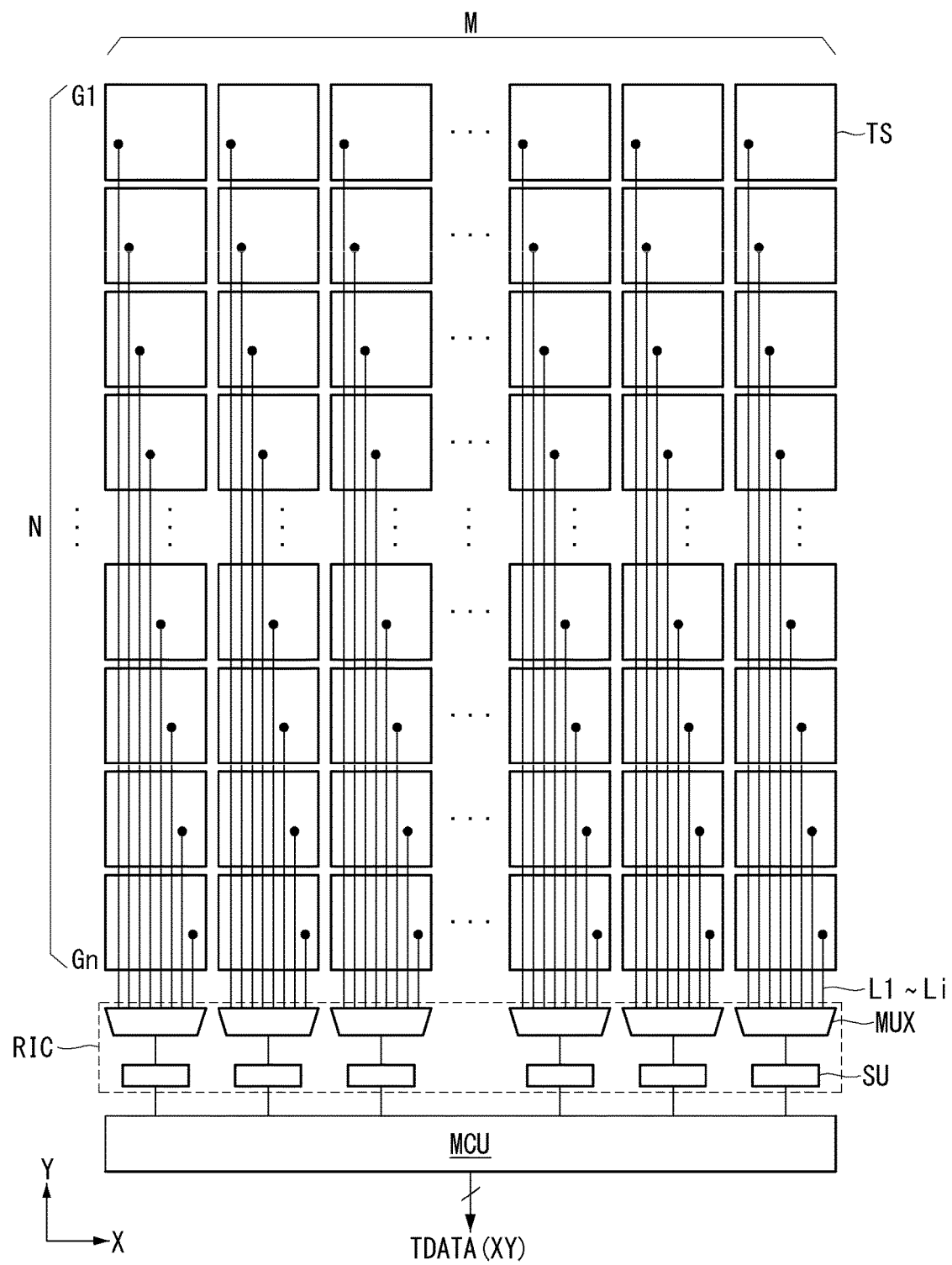
FIG. 7 illustrates multiplexers connected to touch sensors and sensing circuits.

As illustrated in FIG. 7, the touch sensor driver RIC may include multiplexers MUX and sensing circuits SU.

The multiplexer MUX selects touch sensors TS accessed by the sensing circuit SU and then supplies the compensation touch driving signal CVdrv to the selected touch sensors TS under the control of a microcontroller unit (MCU). As illustrated in FIG. 7, when a resolution of the touch sensors TS is M×N, the number of multiplexers MUX required for the resolution is M, where M and N are a positive integer equal to or greater than 2. When the resolution of the touch sensors TS is M×N, the touch sensors TS are divided into M×N. Each multiplexer MUX is connected to the N touch sensors TS through the N sensor lines L1 to Li and sequentially connects the N sensor lines L1 to Li to one sensing circuit SU.

The sensing circuit SU is connected to the sensor lines L1 to Li through the multiplexer MUX. The sensing circuit SU measures a change in a waveform of voltages received from the touch sensors TS and converts the change into digital data. The sensing circuit SU includes an amplifier amplifying the received voltages of the touch sensors TS, an integrator accumulating the amplified voltages of the amplifier, and an analog-to-digital converter (ADC) converting a voltage of the integrator into digital data. The digital data output from the ADC is touch raw data and is transmitted to the MCU.

Figure 8:
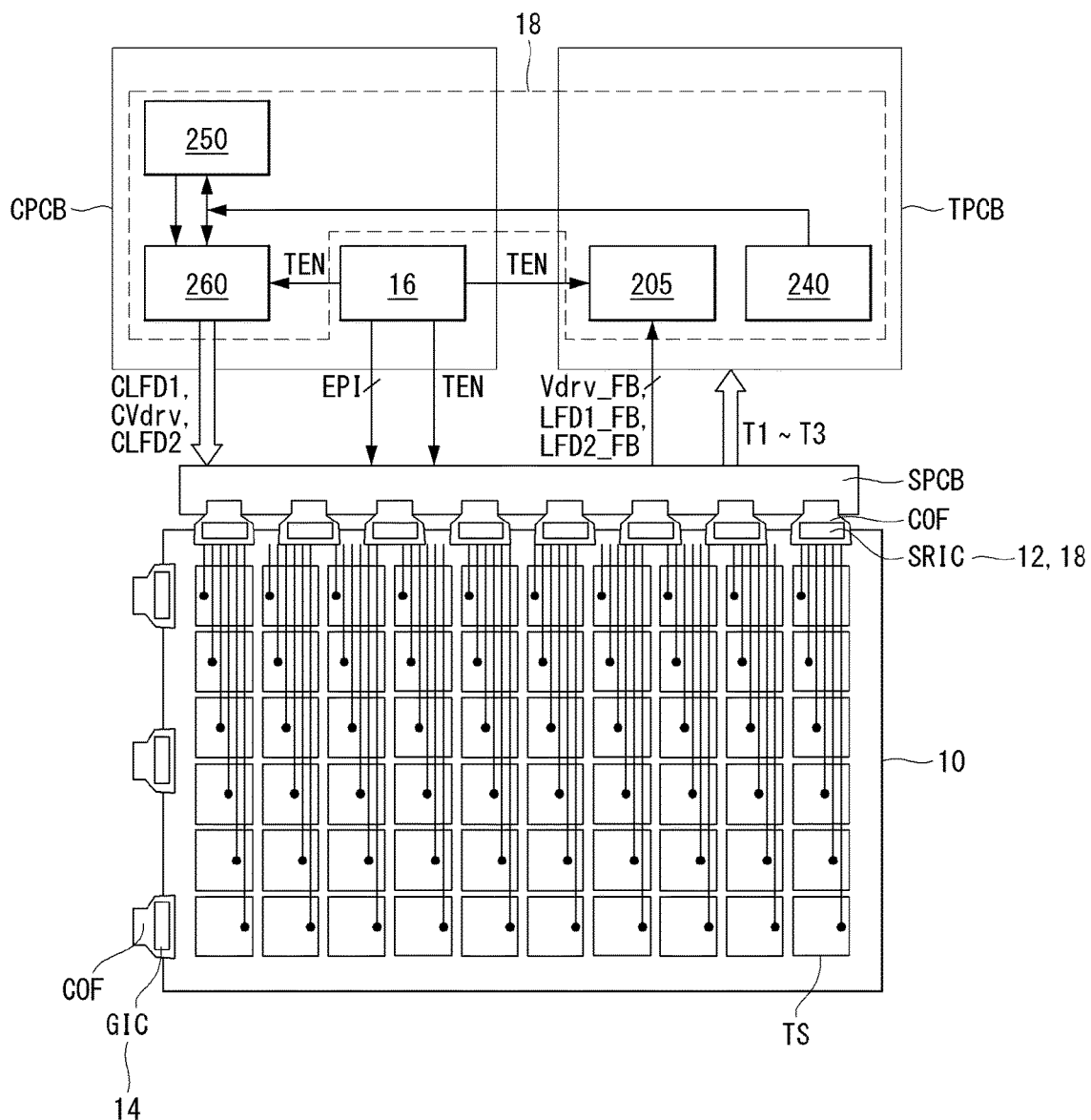
FIG. 8 illustrates a connection relationship of a display panel, a timing controller, a touch driving device, and a display driver according to an exemplary embodiment of the invention.
Figure 9:
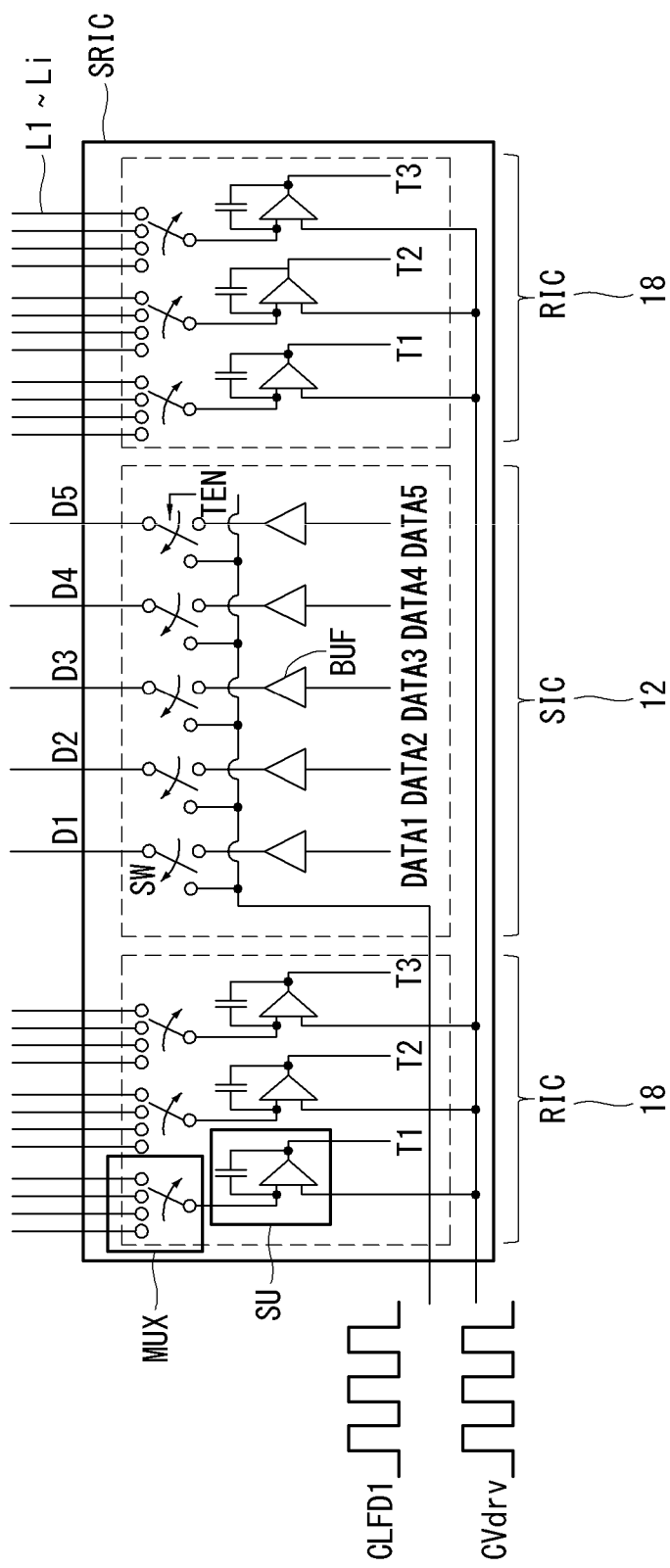
FIG. 9 illustrates internal configuration of SRIC illustrated in FIG. 8.
Figure 10:
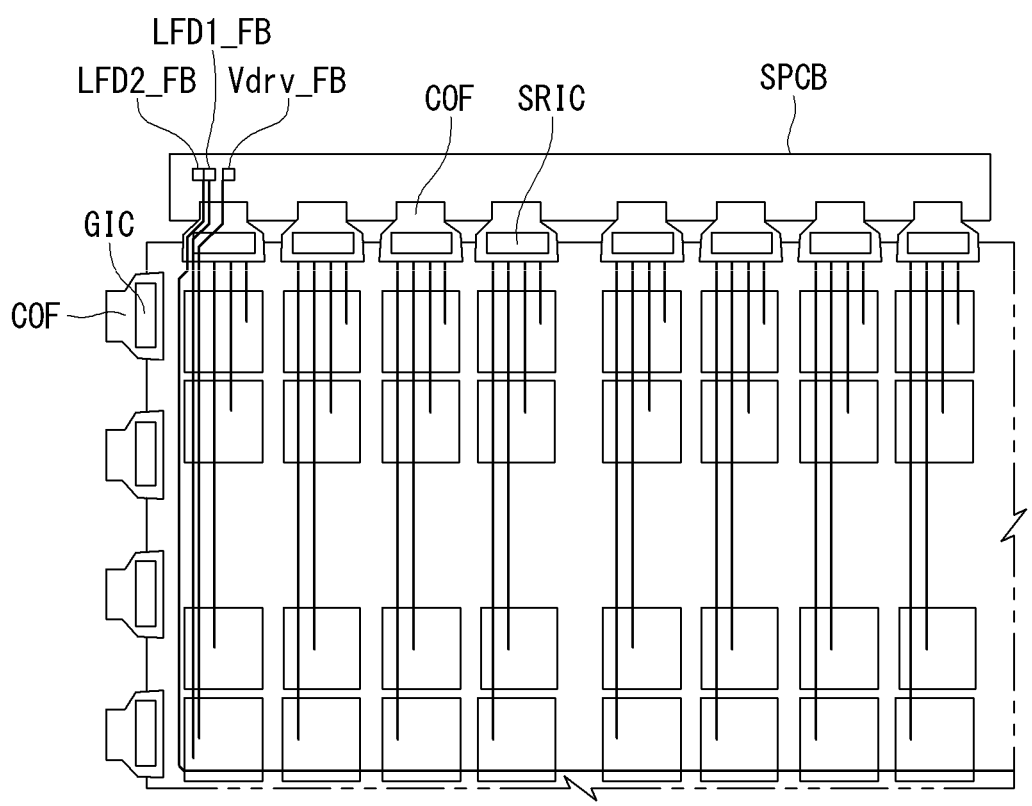
FIG. 10 illustrates an example of a feedback configuration of a touch driving signal and an AC signal from a display panel.
Figure 11:
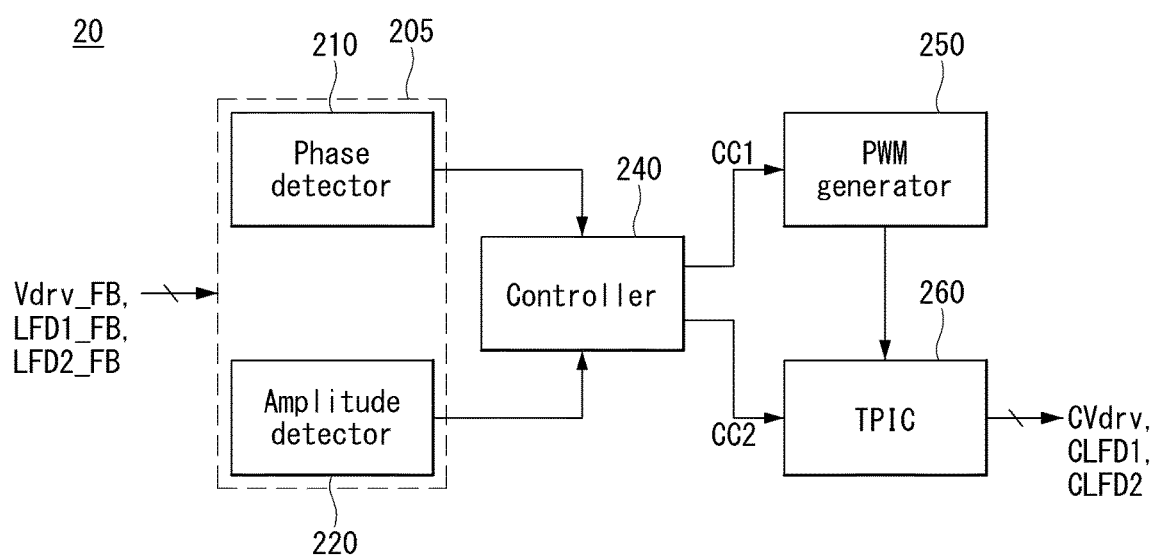
FIG. 11 illustrates a detailed configuration of a deviation compensating circuit included in a touch driving device.

FIG. 8 illustrates a connection relationship of the display panel 10, the timing controller TCON 16, the touch driving device 18, and the display driver (12, 14). FIG. 9 illustrates internal configuration of combined source driver and touch driver SRIC illustrated in FIG. 8. FIG. 10 illustrates an example of a feedback configuration of the touch driving signal and the AC signals from the display panel 10.

Referring to FIGS. 8 to 10, the touch driving device 18 may include a feedback detector 205 and a controller 240 mounted on a touch printed circuit board (PCB) TPCB and a pulse width modulation (PWM) generator 250 and a touch power integrated circuit (IC) TPIC 260 mounted on a control PCB CPCB. The timing controller TCON 16 may be additionally mounted on the control PCB CPCB. The touch PCB TPCB and the control PCB CPCB may be electrically connected to each other through a cable. The touch PCB TPCB and the control PCB CPCB may be combined into one body.

Each of the touch PCB TPCB and the control PCB CPCB may be electrically connected to a source PCB SPCB through a cable. The source PCB SPCB and the display panel 10 may be electrically connected to each other through a first COF (chip-on film). A source driver IC SIC implementing the data driver 12 and the touch sensor driver RIC are combined to form SRIC. The SRIC is mounted on the first COF. A second COF is attached to the display panel 10, and a gate driver IC GIC implementing the gate driver 14 is mounted on the second COF.

As described above with reference to FIG. 7, the touch sensor driver RIC includes the multiplexer MUX and the sensing circuit SU. During the touch sensor driving period, the touch sensor driver RIC supplies the compensation touch driving signal CVdrv received from the touch power IC 260 to the selected touch sensors TS, accumulates charges received from the selected touch sensors TS, and outputs touch raw data T1 to T3. During the display driving period, the connection between the sensor lines L1 to Li and the multiplexer MUX is released, and the sensor lines L1 to Li are connected to a common voltage input terminal (not shown). Thus, the common voltage Vcom is supplied to the touch sensors TS during the display driving period.

The source driver IC SIC includes output control switches SW, which are turned on or off in response to the touch enable signal TEN. During the touch sensor driving period, the output control switches SW connect the touch power IC 260 outputting the first compensation AC signal CLFD1 to the data lines D1 to D5 and cause the first compensation AC signal CLFD1 to be supplied to the data lines D1 to D5. During the display driving period, the output control switches SW connect output buffers BUF outputting data voltages DATA1 to DATA5 to the data lines D1 to D5 and cause the data voltages DATA1 to DATA5 to be supplied to the data lines D1 to D5.

During the touch sensor driving period, the gate driver IC GIC connects the touch power IC 260 outputting the second compensation AC signal CLFD2 to the gate lines G1 to Gn and causes the second compensation AC signal CLFD2 to be supplied to the gate lines G1 to Gn. The gate driver IC GIC and the touch power IC 260 are connected to each other through the first COF, LOG (line-on glass) lines (not shown), the second COF, etc. The LOG lines are signal lines on a display substrate of the display panel 10. The electrical connection between the gate driver IC GIC and the touch power IC 260 is released during the display driving period.

As illustrated in FIG. 10, the feedback detector 205 may receive the feedback signals Vdrv_FB, LFD1_FB, and LFD2_FB through the display panel 10 and the source PCB SPCB. The feedback detector 205 may receive the feedback touch driving signal Vdrv_FB at a best position, at which a phase deviation and an amplitude deviation of the display panel 10 have a minimum value, and the feedback touch driving signal Vdrv_FB at a worst position, at which the phase deviation and the amplitude deviation of the display panel 10 have a maximum value, a total of two times. The feedback detector 205 may receive each of the first feedback AC signal LFD1_FB and the second feedback AC signal LFD2_FB a total of two times, in the same manner as the feedback touch driving signal Vdrv_FB. The best position and the worst position are previously determined through experimentation.

Hereinafter, the feedback touch driving signal Vdrv_FB processed by the deviation compensating circuit 20 may be an average value of the two feedback touch driving signals Vdrv_FB at the best and worst positions; the first feedback AC signal LFD1_FB processed by the deviation compensating circuit 20 may be an average value of the two first feedback AC signals LFD1_FB at the best and worst positions; and the second feedback AC signal LFD2_FB processed by the deviation compensating circuit 20 may be an average value of the two second feedback AC signals LFD2_FB at the best and worst positions. The uniformity of the compensation over the display panel 10 can be improved by using the average values.

FIGS. 11 to 17 illustrate a configuration and an operation of the deviation compensating circuit 20 included in the touch driving device 18.

Referring to FIGS. 11 to 17, the deviation compensating circuit 20 includes the feedback detector 205 including a phase detector 210 and an amplitude detector 220, the controller 240, the PWM generator 250, and the touch power IC 260 (or TPIC).

The phase detector 210 detects phases of the feedback touch driving signal Vdrv_FB, the first feedback AC signal LFD1_FB, and the second feedback AC signal LFD2_FB.

The amplitude detector 220 detects amplitudes of the feedback touch driving signal Vdrv_FB, the first feedback AC signal LFD1_FB, and the second feedback AC signal LFD2_FB.

The controller 240 detects a phase deviation and an amplitude deviation between the feedback touch driving signal Vdrv_FB and the first and second feedback AC signals LFD1_FB and LFD2_FB and outputs a first compensation control signal CC1 for compensating for the phase deviation and a second compensation control signal CC2 for compensating for the amplitude deviation.

The PWM generator 250 outputs a first PWM signal DVdrv, a second PWM signal DLFD1, and a third PWM signal DLFD2, each of which has a compensated phase in response to the first compensation control signal CC1.

The touch power IC 260 produces the compensation touch driving signal CVdrv based on the first PWM signal DVdrv, the first compensation AC signal CLFD1 based on the second PWM signal DLFD1, and the second compensation AC signal CLFD2 based on the third PWM signal DLFD2. The touch power IC 260 adjusts a maximum voltage of each of the compensation touch driving signal CVdrv, the first compensation AC signal CLFD1, and the second compensation AC signal CLFD2 in response to the second compensation control signal CC2.

Figure 15:
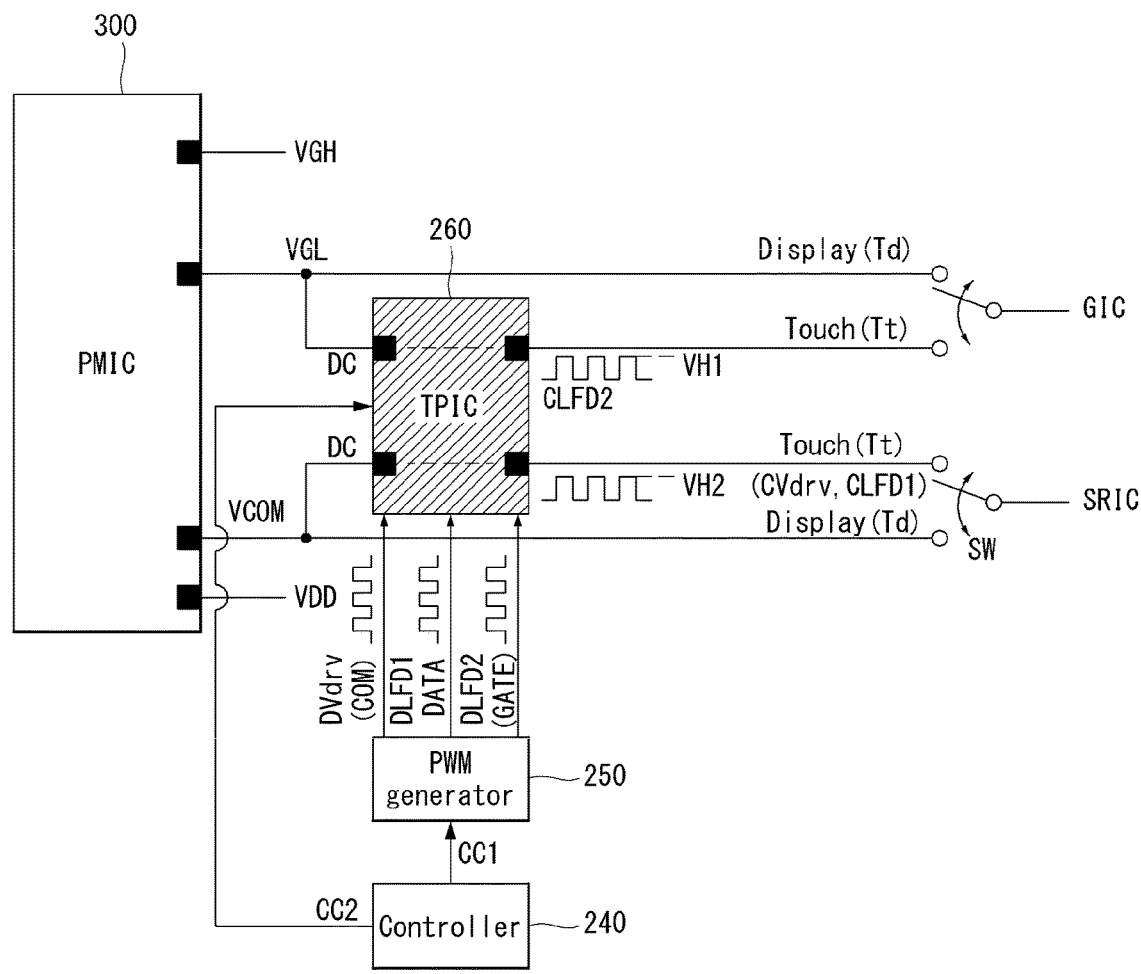
FIG. 15 illustrates an operation of a controller, a PWM generator, and a touch power IC for compensating for a phase deviation and an amplitude deviation.

As illustrated in FIG. 15, the touch power IC 260 receives a gate low voltage VGL of a DC (direct current) level and the common voltage Vcom from a main power IC 300 (or PMIC). The gate low voltage VGL is a voltage capable of turning off the TFTs included in the display panel 10. The touch power IC 260 level-shifts the first PWM signal DVdrv received from the PWM generator 250 based on the common voltage Vcom and produces the compensation touch driving signal CVdrv illustrated in FIG. 16. The touch power IC 260 level-shifts the second PWM signal DLFD1 received from the PWM generator 250 based on the common voltage Vcom and produces the first compensation AC signal CLFD1 illustrated in FIG. 16. The touch power IC 260 level-shifts the third PWM signal DLFD2 received from the PWM generator 250 based on the gate low voltage VGL and produces the second compensation AC signal CLFD2 illustrated in FIG. 16.

The main power IC 300 produces a gate high voltage VGH, the gate low voltage VGL, the common voltage Vcom, a high potential driving voltage VDD, and the like.

The gate high voltage VGH is a voltage capable of turning on the TFTs included in the display panel 10. The gate high voltage VGH and the gate low voltage VGL are voltages for producing the gate pulse (or scan pulse) applied to the gate lines. The high potential driving voltage VDD is a power voltage supplied to a gamma string included in the source driver IC SIC.

Figure 12:
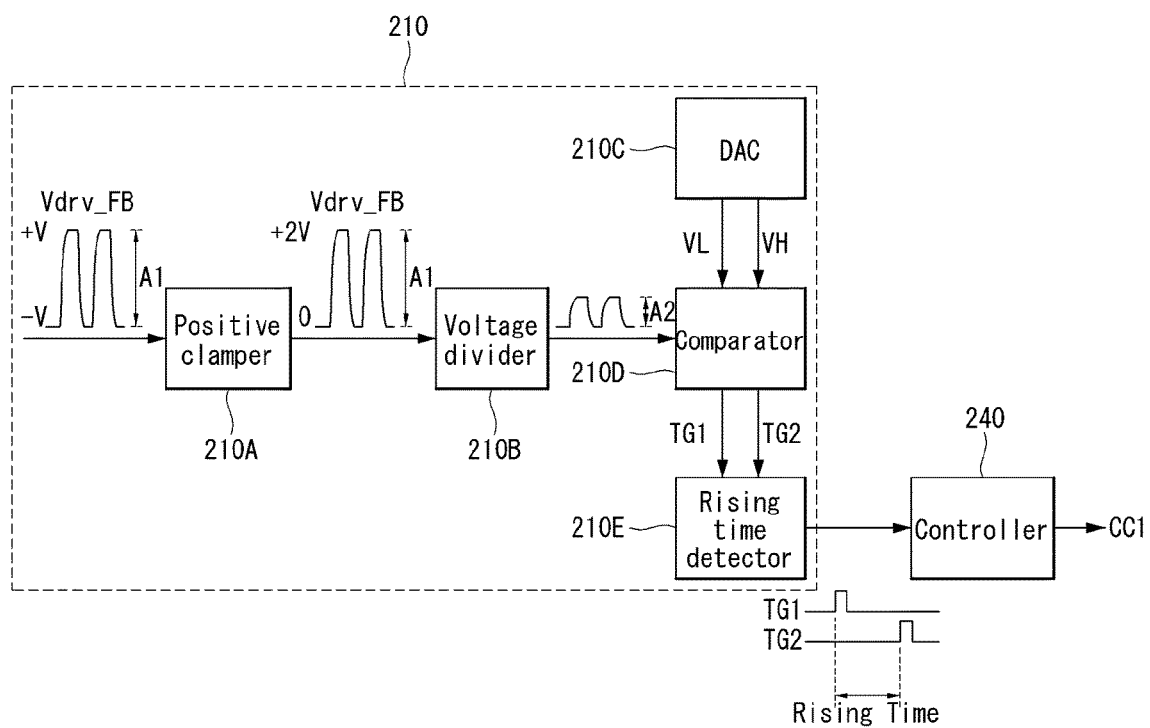
FIG. 12 illustrates a configuration and an operation of a phase detector illustrated in FIG. 11.

As illustrated in FIG. 12, the phase detector 210 includes a positive clamper 210A for clamping each of the feedback touch driving signal Vdrv_FB, the first feedback AC signal LFD1_FB, and the second feedback AC signal LFD2_FB in a positive (+) direction, a voltage divider 210B for downscaling an amplitude A1 of the clamped signal, a digital-to-analog converter DAC 210C for producing a low reference voltage VL and a high reference voltage VH for measuring a rising time, a comparator 210D for comparing the low reference voltage VL and the high reference voltage VH with one pulse of a downscaled signal having an amplitude A2 and outputting a rising start time point TG1 and a rising end time point TG2 of the downscaled signal, and a rising time detector 210E for detecting a period of time between the rising start time point TG1 and the rising end time point TG2 as the rising time.

Only when a rising time of the feedback touch driving signal Vdrv_FB exceeds a previously set critical value, the controller 240 produces the first compensation control signal CC1 for compensating for a phase deviation. The first compensation control signal CC1 includes a first phase control value for compensating for a rising time deviation between the feedback touch driving signal Vdrv_FB and the first feedback AC signal LFD1_FB and a second phase control value for compensating for a rising time deviation between the feedback touch driving signal Vdrv_FB and the second feedback AC signal LFD2_FB.

Figure 13:
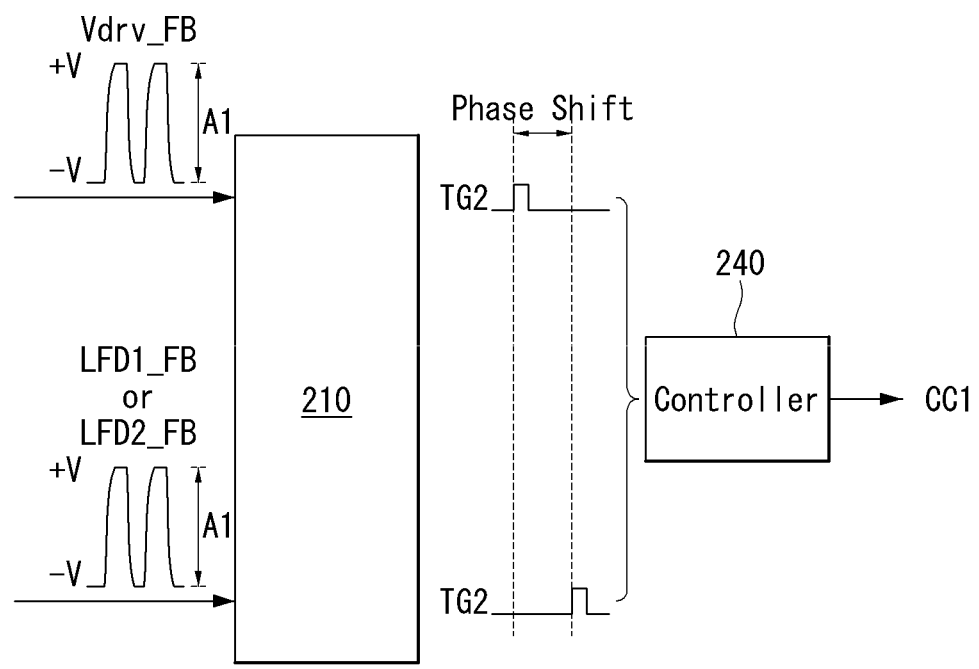
FIG. 13 illustrates an operation for detecting a phase deviation in a controller illustrated in FIG. 11.

As illustrated in FIG. 13, the first phase control value is determined depending on a difference between a rising end time point TG2 of the feedback touch driving signal Vdrv_FB and a rising end time point TG2 of the first feedback AC signal LFD1_FB. In the same manner as the first phase control value, the second phase control value is determined depending on a difference between the rising end time point TG2 of the feedback touch driving signal Vdrv_FB and a rising end time point TG2 of the second feedback AC signal LFD2_FB.

Figure 14:
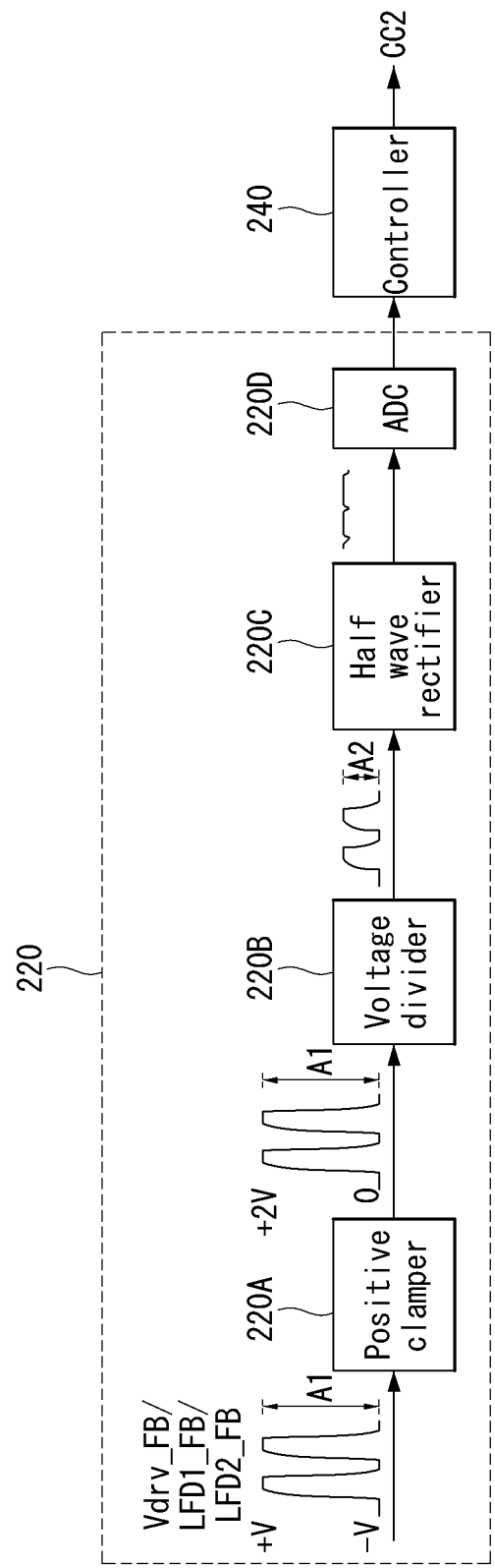
FIG. 14 illustrates a configuration and an operation of an amplitude detector illustrated in FIG. 11.

As illustrated in FIG. 14, the amplitude detector 220 includes a positive clamper 220A for clamping each of the feedback touch driving signal Vdrv_FB, the first feedback AC signal LFD1_FB, and the second feedback AC signal LFD2_FB in a positive (+) direction, a voltage divider 220B for downscaling an amplitude A1 of the clamped signal, a half wave rectifier 220C for converting a downscaled signal having an amplitude A2 into an analog DC voltage, and an analog-to-digital converter ADC 220D for converting the analog DC voltage into a digital DC voltage.

The controller 240 compares the digital DC voltage of each of the feedback touch driving signal Vdrv_FB, the first feedback AC signal LFD1_FB, and the second feedback AC signal LFD2_FB with a reference value and outputs the second compensation control signal CC2 for compensating for the amplitude deviation.

The touch power IC 260 individually adjusts a maximum voltage VH2 of the compensation touch driving signal CVdrv, a maximum voltage VH2 of the first compensation AC signal CLFD1, and a maximum voltage VH2 of the second compensation AC signal CLFD2 in response to the second compensation control signal CC2.

Figure 16:
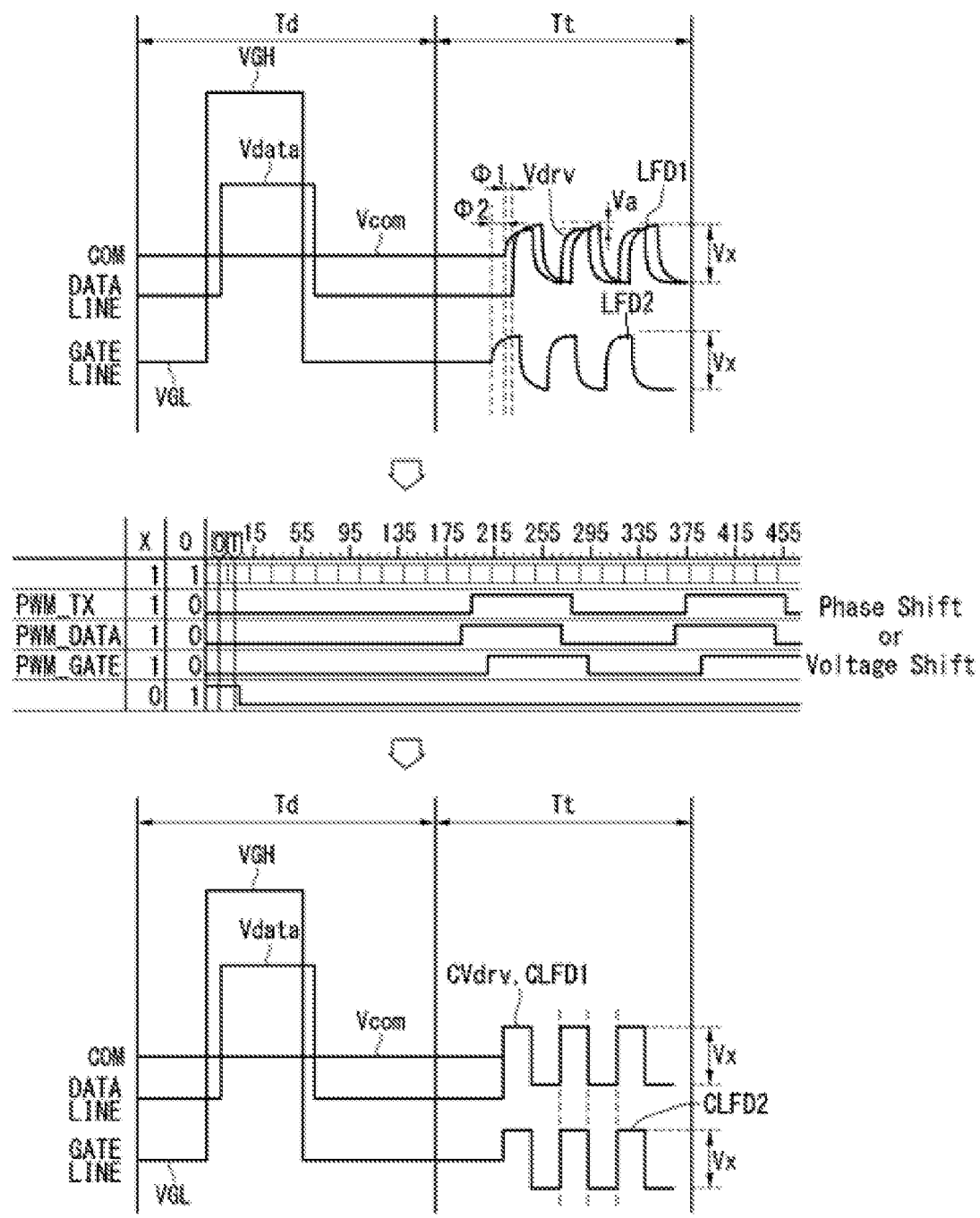
FIGS. 16 and 17 illustrate that a phase difference and an amplitude difference between a feedback touch driving signal and feedback AC signals are compensated using a deviation compensating circuit according to an exemplary embodiment of the invention.

As illustrated in FIG. 16, phases of AC signals LFD1 and LFD2 respectively deviate from a touch driving signal Vdrv by φ1 and φ2, and amplitudes of the AC signals LFD1 and LFD2 deviate from the touch driving signal Vdrv by Va. As described above, when there are a phase difference and an amplitude difference between the touch driving signal Vdrv and the AC signals LFD1 and LFD2, the load free effect is reduced.

Figure 17:
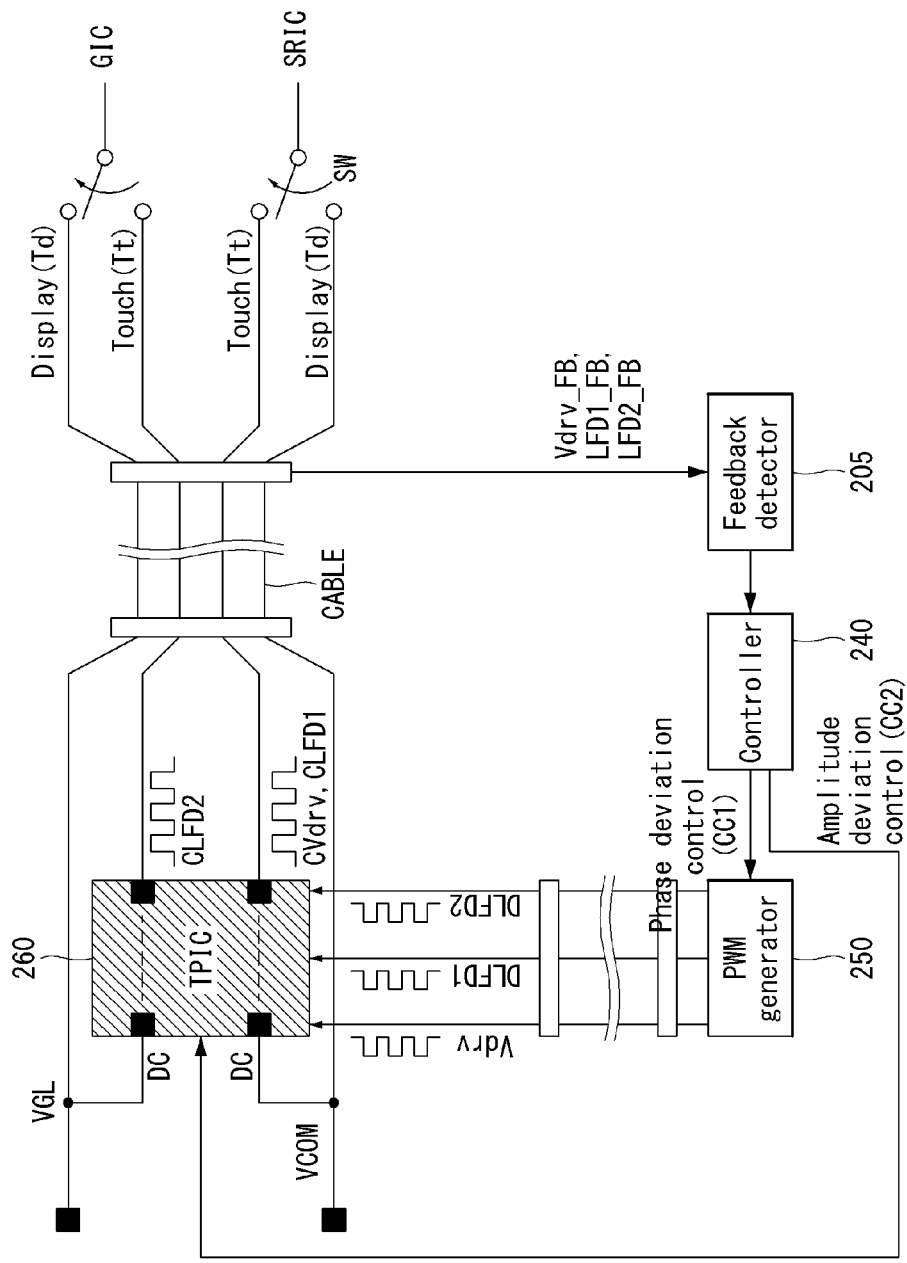

As illustrated in FIGS. 16 and 17, circuitry of the embodiment of the invention receives the feedback touch driving signal Vdrv_FB and the first and second feedback AC signals LFD1_FB and LFD2_FB from the display panel 10 and supplies the compensation touch driving signal CVdrv, the first compensation AC signal CLFD1, and the second compensation AC signal CLFD2 for compensating for the phase difference and the amplitude difference between the feedback touch driving signal Vdrv_FB and the first and second feedback AC signals LFD1_FB and LFD2_FB to the display panel 10, thereby increasing the load free effect.

Figure 18:
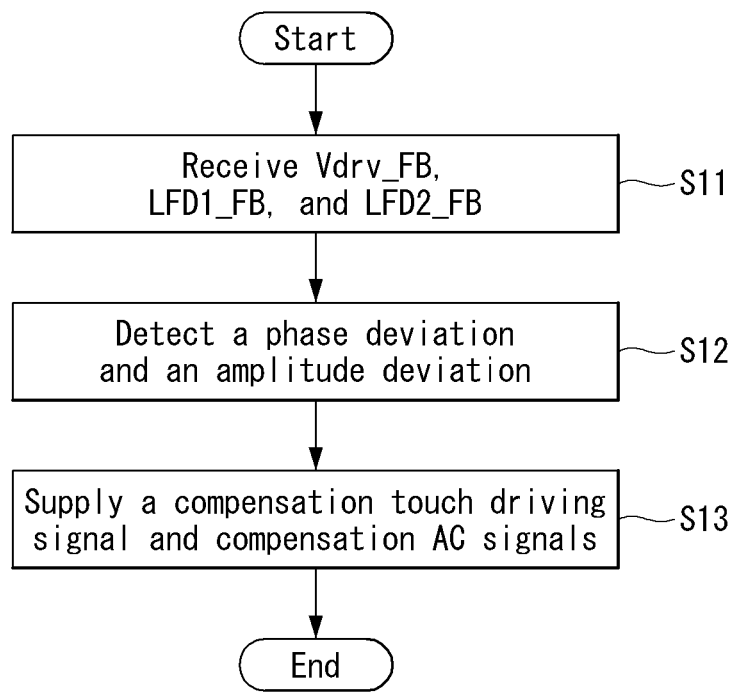
FIG. 18 illustrates a deviation compensation method performed by a deviation compensating circuit according to an exemplary embodiment of the invention.

FIG. 18 illustrates a deviation compensation method performed by the deviation compensating circuit 20 according to the embodiment of the invention.

Referring to FIG. 18, in a deviation compensation method according to the embodiment of the invention, circuitry receives the feedback touch driving signal Vdrv_FB from at least one of the sensor lines connected to the touch sensors, receives the first feedback AC signal LFD1_FB from at least one of the data lines connected to the pixels, and receives the second feedback AC signal LFD2_FB from at least one of the gate lines connected to the pixels in step S11.

The circuitry of a deviation compensation method according to the embodiment of the invention detects a phase deviation and an amplitude deviation between the feedback touch driving signal Vdrv_FB and the first and second feedback AC signals LFD1_FB and LFD2_FB and then produces a compensation touch driving signal, a first compensation AC signal, and a second compensation AC signal for compensating for the phase deviation and the amplitude deviation in step S12.

The circuitry of a deviation compensation method according to the embodiment of the invention supplies the compensation touch driving signal to the sensor lines, supplies the first compensation AC signal to the data lines, and supplies the second compensation AC signal to the gate lines during a touch sensor driving period, in which a touch input is sensed, in step S13.

Figure 19:
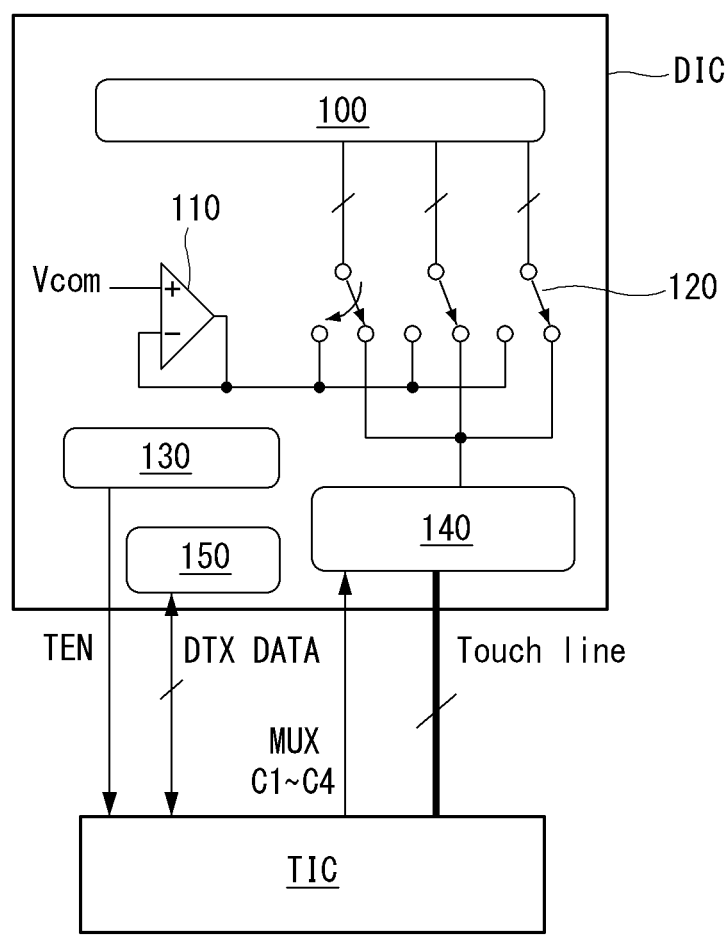
FIGS. 19 to 21 illustrate various examples of a touch driving device according to an exemplary embodiment of the invention.
Figure 20:
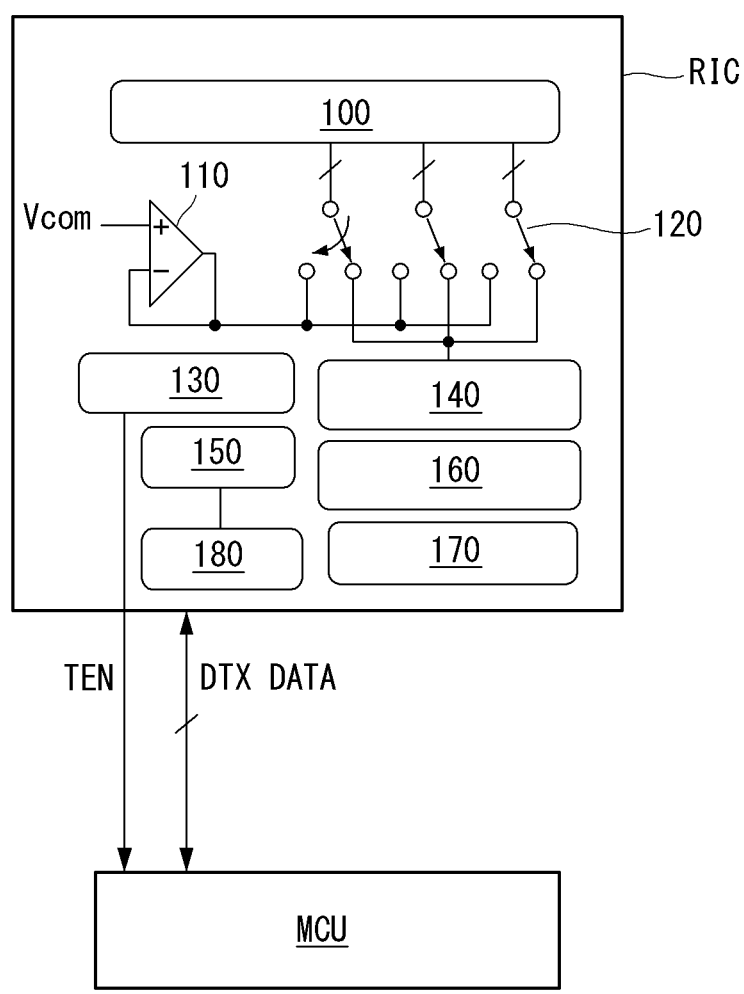
Figure 21:
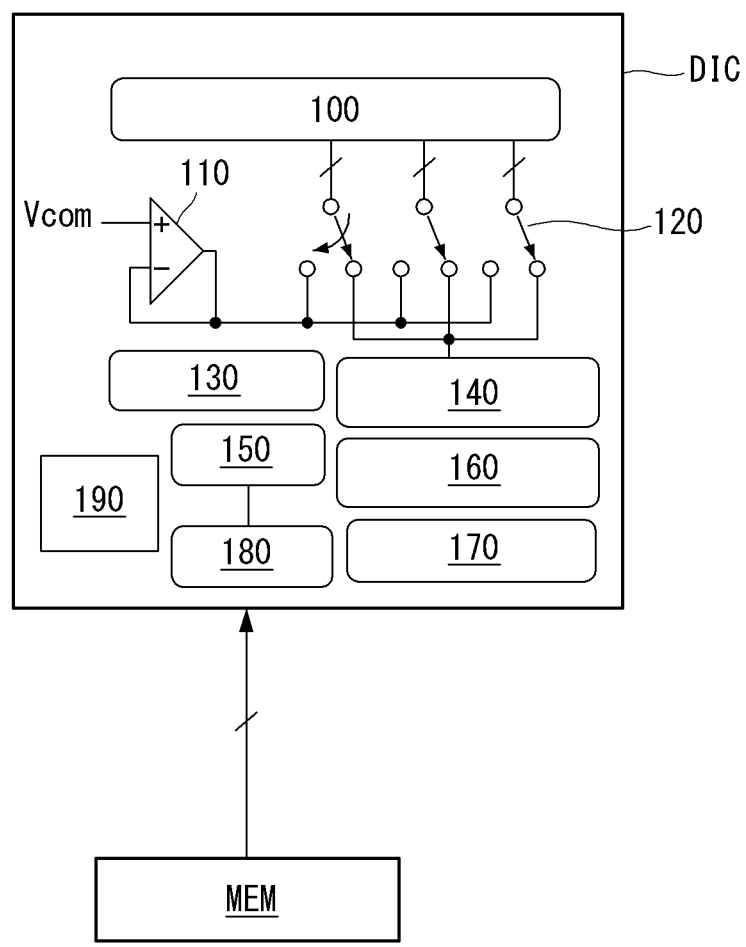

FIGS. 19 to 21 illustrate various examples of the touch driving device 18 according to the embodiment of the invention.

The touch driving device 18 according to the embodiment of the invention may be implemented as an IC package illustrated in FIGS. 19 to 21.

Referring to FIG. 19, the touch driving device 18 includes a driver IC DIC and a touch sensing IC TIC.

The driver IC DIC includes a touch sensor channel circuit 100, a Vcom buffer 110, a switch array 120, a timing control signal generator 130, a multiplexer (MUX) 140, and a DTX compensation circuit 150.

The touch sensor channel circuit 100 is connected to electrodes of the touch sensors through the sensor lines and is connected to the Vcom buffer 110 and the multiplexer 140 through the switch array 120. The multiplexer 140 connects the sensor lines to the touch sensing IC TIC. In case of a 1-to-3 multiplexer, the multiplexer 140 sequentially connects one channel of the touch sensing IC TIC to the three sensor lines in the time-division manner and thus reduces the number of channels of the touch sensing IC TIC. The multiplexer 140 sequentially selects the sensor lines, which will be connected to the channel of the touch sensing IC TIC, in response to MUX control signals MUXC1 to MUXC3. The multiplexer 140 is connected to the channels of the touch sensing IC TIC through touch lines.

The Vcom buffer 110 outputs the common voltage Vcom of the pixel. The switch array 120 supplies the common voltage Vcom output from the Vcom buffer 110 to the touch sensor channel circuit 100 during the display driving period under the control of the timing control signal generator 130. The switch array 120 connects the sensor lines to the touch sensing IC TIC during the touch sensor driving period under the control of the timing control signal generator 130.

The timing control signal generator 130 generates timing control signals for controlling operation timings of the display driver and the touch sensing IC TIC. The display driver includes a data driver 12 for applying data of an input image to the pixels and a gate driver 14. The data driver 12 generates a data voltage and supplies the data voltage to data lines D1 to Dm of the display panel 10. The data driver 12 may be integrated into the driver IC DIC. The gate driver 14 sequentially supplies a gate pulse (or a scan pulse) synchronized with the data voltage to gate lines G1 to Gn of the display panel 10. The gate driver 14 may be disposed on a substrate of the display panel 10 along with the pixels.

Figure 3:
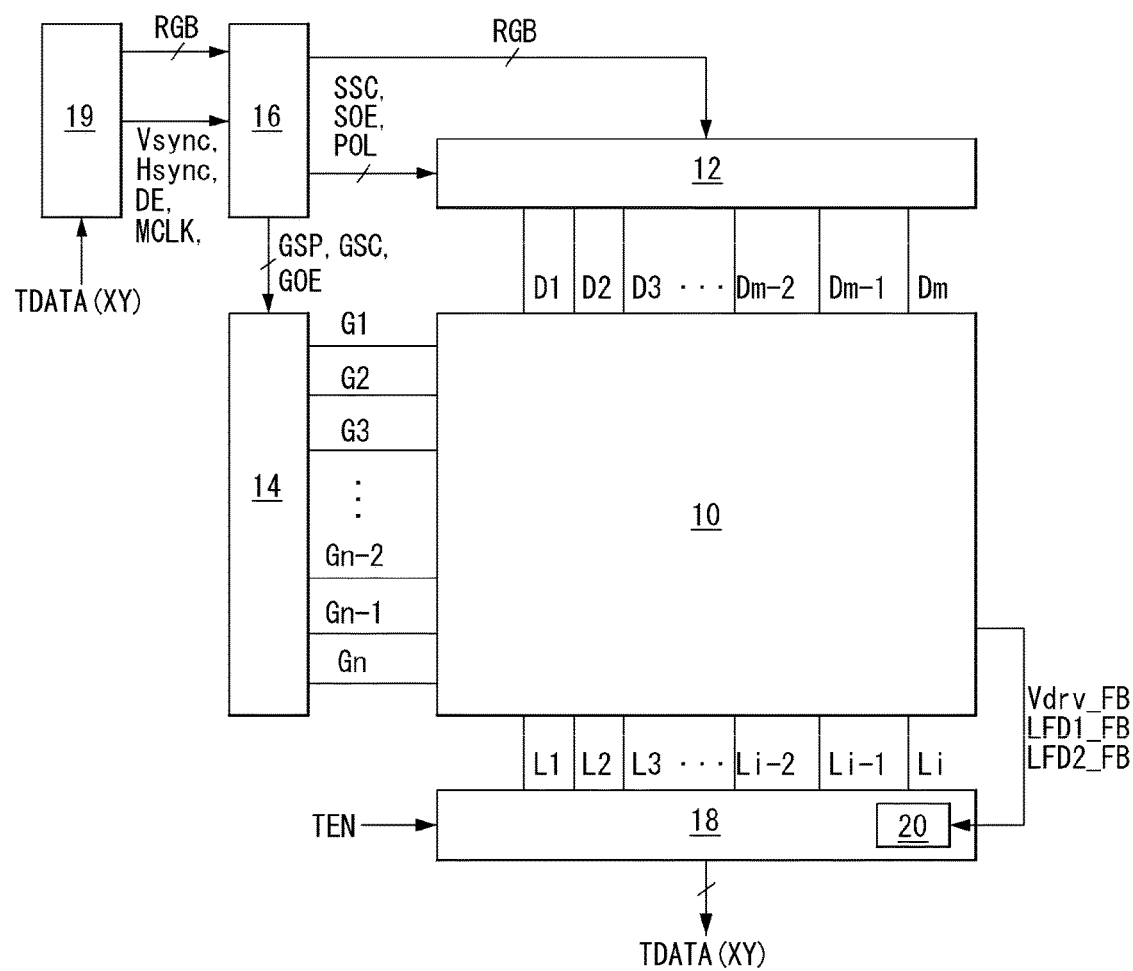
FIG. 3 illustrates a display device according to an exemplary embodiment of the invention.

The timing control signal generator 130 of the driver IC DIC is substantially the same as a timing control signal generator present in the timing controller 16 illustrated in FIG. 3. The timing control signal generator 130 drives the display driver during the display driving period and drives the touch sensing IC TIC during the touch sensor driving period.

The timing control signal generator 130, as illustrated in FIG. 5, produces the touch enable signal TEN defining the display driving periods Td1 and Td2 and the touch sensor driving periods Tt1 and Tt2 and synchronizes the display driver with the touch sensing IC TIC. The display driver applies data to the pixels during a first level period of the touch enable signal TEN. The touch sensing IC TIC drives the touch sensors in response to a second level of the touch enable signal TEN and senses the touch input. A first level of the touch enable signal TEN may be a high level, and the second level of the touch enable signal TEN may be a low level, or vice versa.

The touch sensing IC TIC is connected to a driving power circuit (not shown) and receives driving power. The touch sensing IC TIC produces the touch sensor driving signal in response to the second level of the touch enable signal TEN and applies the touch sensor driving signal to the touch sensors. The touch sensor driving signal may be generated in various pulse shapes including a square wave, a sine wave, a triangle wave, etc. However, it is preferable, but not required, that the touch sensor driving signal is generated in the pulse shape of the square wave. The touch sensor driving signal may be applied to each of the touch sensors N times, so that charges are accumulated on an integrator of the touch sensing IC TIC N or more times, where N is a natural number equal to or greater than 2.

A noise of the touch sensor driving signal may increase depending on changes in data of the input image. The DTX compensation circuit 150 analyzes the data of the input image, removes a noise component from touch raw data depending on changes in a gray level of the input image, and transmits it to the touch sensing IC TIC. DTX stands for Display and Touch crosstalk. The content related to the DTX compensation circuit 150 is disclosed in detail in Korean Patent Application No. 10-2012-0149028 (Dec. 19, 2012)

from the present applicant, and which is hereby incorporated by reference in its entirety. In case of a system, in which noise of the touch sensor does not sensitively change depending on changes in data of the input image, the DTX compensation circuit 150 is not necessary, and thus, may be omitted. In FIG. 19, "DTX DATA" is output data of the DTX compensation circuit 150.

The touch sensing IC TIC drives the multiplexer 140 in response to the touch enable signal TEN from the timing control signal generator 130 during the touch sensor driving periods Tt1 and Tt2 and receives charges of the touch sensors through the multiplexer 140 and the sensor lines.

The touch sensing IC TIC detects a change in charges before and after the touch input from the touch sensor driving signal and compares the change in charges with a predetermined threshold value. The touch sensing IC TIC determines a location of the touch sensors having the change in charges, which is equal to or greater than the threshold value, as an area of the touch input. The touch sensing IC TIC calculates coordinates of each touch input and transmits touch data TDATA(XY) including coordinate information of the touch input to the external host system 19. The touch sensing IC TIC includes an amplifier amplifying charges of the touch sensor, an integrator accumulating charges received from the touch sensor, an analog-to-digital converter (ADC) converting a voltage of the integrator into digital data, and an arithmetic logic circuit. The arithmetic logic circuit compares touch raw data output from the ADC with the threshold value and determines the touch input based on the result of a comparison. The arithmetic logic circuit performs a touch recognition algorithm calculating coordinates.

The driver IC DIC and the touch sensing IC TIC may transmit and receive signals through a serial peripheral interface (SPI) or a bus low-voltage differential signaling (BLVDS) interface.

The host system 19 is a system main body of an electronic device, to which the display device according to the embodiment of the invention applies. The host system 19 may be implemented as one of a phone system, a television system, a set-top box, a navigation system, a DVD player, a Blu-ray player, a personal computer (PC), and a home theater system, or the like. The host system 19 receives touch input data TDATA(XY) from the touch sensing IC TIC and executes an application associated with the touch input.

Referring to FIG. 20, in an aspect of an exemplified embodiment, the touch driving device 18 includes a readout IC RIC and a microcontroller unit (MCU).

The readout IC RIC includes a touch sensor channel circuit 100, a Vcom buffer 110, a switch array 120, a first timing control signal generator 130, a multiplexer (MUX) 140, a DTX compensation circuit 150, a sensing circuit 160, a second timing control signal generator 170, and a memory 180. The readout IC RIC illustrated in FIG. 20 is different from the driver IC DIC illustrated in FIG. 19 in that the sensing circuit 160 and the second timing control signal generator 170 are integrated inside the readout IC RIC. The first timing control signal generator 130 of FIG. 20 is substantially the same as the timing control signal generator 130 of FIG. 19. Thus, the first timing control signal generator 130 generates timing control signals for controlling operation timings of the display driver and the readout IC RIC.

The multiplexer 140 floats electrodes of the touch sensor accessed by the sensing circuit 160 under the control of the MCU. The touch sensor electrodes accessed by the sensing circuit 160 are selected by the sensing circuit 160 among other touch sensor electrodes except the touch sensor electrodes connected to the pixels charged to the data voltage. The multiplexer 140 may supply the common voltage Vcom under the control of the MCU.

The sensing circuit 160 is connected to the sensor lines through the multiplexer 140. The sensing circuit 160 measures a change in a waveform of the voltage received from the touch sensors and converts the change into digital data. The sensing circuit 160 includes an amplifier amplifying the received voltages of the touch sensor electrodes 22, an integrator accumulating the amplified voltages of the amplifier, and an analog-to-digital converter (ADC) converting a voltage of the integrator into digital data. The digital data output from the ADC is touch raw data TDATA and is transmitted to the MCU.

The second timing control signal generator 170 generates timing control signals and clocks for controlling operation timings of the multiplexer 140 and the sensing circuit 160. The DTX compensation circuit 150 may be omitted in the readout IC RIC. The memory 180 temporarily stores the touch raw data TDATA under the control of the second timing control signal generator 170.

The readout IC RIC and the MCU may transmit and receive signals through a serial peripheral interface (SPI) or a bus low-voltage differential signaling (BLVDS) interface. The MCU compares the touch raw data TDATA with a predetermined threshold value and determines a touch input based on the result of a comparison. The MCU performs a touch recognition algorithm calculating coordinates.

Referring to FIG. 21, the touch driving device 18 includes a driver IC DIC and a memory MEM.

The driver IC DIC includes a touch sensor channel circuit 100, a Vcom buffer 110, a switch array 120, a first timing control signal generator 130, a multiplexer 140, a DTX compensation circuit 150, a sensing circuit 160, a second timing control signal generator 170, a memory 180, and a MCU 190. The driver IC DIC illustrated in FIG. 21 is different from the readout IC RIC illustrated in FIG. 20 in that the MCU 190 is integrated inside the driver IC DIC. The MCU 190 compares touch raw data TDATA with a predetermined threshold value and determines a touch input based on the result of a comparison. The MCU 190 performs a touch recognition algorithm calculating coordinates.

The memory MEM stores a register setting value related to timing information required in operations of the display driver and the sensing circuit 160. When the display device 10 is powered on, the register setting value is loaded from the memory MEM to the first timing control signal generator 130 and the second timing control signal generator 170. The first timing control signal generator 130 and the second timing control signal generator 170 generate timing control signals for controlling the display driver and the sensing circuit 160 based on the register setting value read from the memory MEM. The embodiment of the invention can respond to changes in a model of a driving device without change in a structure of the driving device by changing the register setting value of the memory MEM.

As described above, the embodiment of the invention receives the feedback touch driving signal and the feedback AC signals and compensates for the deviation between the feedback touch driving signal and the feedback AC signals, thereby increasing the load free effect.

Although embodiments have been described with reference to a number of illustrative embodiments thereof, it should be understood that numerous other modifications and embodiments can be devised by those skilled in the art that will fall within the scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel including a plurality of pixels for displaying an input image and a plurality of touch sensors for sensing a touch input;
a deviation compensating circuit to receive a feedback touch driving signal from a sensor line connected to one of the plurality of touch sensors, receive a first feedback alternating current (AC) signal from a data line connected to one of the plurality of pixels, receive a second feedback AC signal from a gate line connected to one of the plurality of pixels, and generate a compensation touch driving signal, a first compensation AC signal, and a second compensation AC signal for compensating;
a touch sensor driver to supply the compensation touch driving signal to the sensor line during a touch sensor driving period, in which the touch input is sensed; and
a display driver to supply the first compensation AC signal to the data line and supply the second compensation AC signal to the gate line during the touch sensor driving period,
wherein the deviation compensating circuit comprises:
a controller to detect a phase deviation and an amplitude deviation between the feedback touch driving signal and the first and the second feedback AC signals and output a first compensation control signal for compensating for the phase deviation and a second compensation control signal for compensating for the amplitude deviation;
a pulse width modulation (PWM) generator to output a first PWM signal, a second PWM signal, and a third PWM signal, each of which has a compensated phase in response to the first compensation control signal; and
a touch power integrated circuit (IC) to produce the compensation touch driving signal based on the first PWM signal, produce the first compensation AC signal based on the second PWM signal, produce the second compensation AC signal based on the third PWM signal, and adjust a maximum voltage of each of the compensation touch driving signal, the first compensation AC signal, and the second compensation AC signal in response to the second compensation control signal.

2. The display device of claim 1, wherein the deviation compensating circuit further comprises:
a phase detector to detect phases of the feedback touch driving signal, the first feedback AC signal, and the second feedback AC signal;
an amplitude detector to detect amplitudes of the feedback touch driving signal, the first feedback AC signal, and the second feedback AC signal.

3. The display device of claim 2, wherein the phase detector comprises:
a positive clamper to clamp each of the feedback touch driving signal, the first feedback AC signal, and the second feedback AC signal in a positive direction;
a voltage divider to downscale an amplitude of the clamped signal;
a digital-to-analog converter (DAC) to produce a low reference voltage and a high reference voltage for measuring a rising time;
a comparator to compare the low reference voltage and the high reference voltage with the downscaled signal and output a rising start time point and a rising end time point of the downscaled signal; and
a rising time detector to detect a period of time between the rising start time point and the rising end time point as a rising time.

4. The display device of claim 1, wherein only when a rising time of the feedback touch driving signal exceeds a previously set critical value, the controller produces the first compensation control signal for compensating for the phase deviation.

5. The display device of claim 4, wherein the first compensation control signal includes a first phase control value for compensating for a rising time deviation between the feedback touch driving signal and the first feedback AC signal and a second phase control value for compensating for a rising time deviation between the feedback touch driving signal and the second feedback AC signal.

6. The display device of claim 2, wherein the amplitude detector comprises:
a positive clamper to clamp each of the feedback touch driving signal, the first feedback AC signal, and the second feedback AC signal in a positive direction;
a voltage divider to downscale an amplitude of the clamped signal;
a half wave rectifier to convert the downscaled signal into an analog direct current (DC) voltage; and
an analog-to-digital converter (ADC) to convert the analog DC voltage into a digital DC voltage.

7. The display device of claim 6, wherein the controller compares the digital DC voltage of each of the feedback touch driving signal, the first feedback AC signal, and the second feedback AC signal with a reference value and outputs the second compensation control signal for compensating for the amplitude deviation.

8. A method for driving a display device including a display panel, including a plurality of pixels for displaying an input image and a plurality of touch sensors for sensing a touch input, the method comprising:
receiving a feedback touch driving signal from a sensor line connected to one of the plurality of touch sensors, receiving a first feedback alternating current (AC) signal from a data line connected to one of the plurality of pixels, receiving a second feedback AC signal from a gate line connected to one of the plurality of pixels;
generating a compensation touch driving signal, a first compensation AC signal, and a second compensation AC signal; and
supplying the compensation touch driving signal to the sensor line during a touch sensor driving period, in which the touch input is sensed, supplying the first compensation AC signal to the data line during the touch sensor driving period, and supplying the second compensation AC signal to the gate line during the touch sensor driving period,
wherein the generating of the compensation touch driving signal, the first compensation AC signal, and the second compensation AC signal comprises:
detecting a phase deviation and an amplitude deviation between the feedback touch driving signal and the first and the second feedback AC signals and outputting a first compensation control signal for compensating for the phase deviation and a second compensation control signal for compensating for the amplitude deviation;

outputting a first pulse width modulation (PWM) signal, a second PWM signal, and a third PWM signal, each of which has a compensated phase in response to the first compensation control signal; and generating the compensation touch driving signal based on the first PWM signal, generating the first compensation AC signal based on the second PWM signal, generating the second compensation AC signal based on the third PWM signal, and adjusting a maximum voltage of each of the compensation touch driving signal, the first compensation AC signal, and the second compensation AC signal in response to the second compensation control signal.

9. The method of claim 8, wherein the generating of the compensation touch driving signal, the first compensation AC signal, and the second compensation AC signal further comprises:

detecting phases of the feedback touch driving signal, the first feedback AC signal, and the second feedback AC signal;

detecting amplitudes of the feedback touch driving signal, the first feedback AC signal, and the second feedback AC signal.

10. The method of claim 9, wherein the detecting of the phases of the feedback touch driving signal, the first feedback AC signal, and the second feedback AC signal comprises:

clamping each of the feedback touch driving signal, the first feedback AC signal, and the second feedback AC signal in a positive direction;

downscaling an amplitude of the clamped signal;

producing a low reference voltage and a high reference voltage for measuring a rising time;

comparing the low reference voltage and the high reference voltage with the downscaled signal and outputting a rising start time point and a rising end time point of the downscaled signal; and detecting a period of time between the rising start time point and the rising end time point as a rising time.

11. The method of claim 8, wherein only when a rising time of the feedback touch driving signal exceeds a previously set critical value, the first compensation control signal is output.

12. The method of claim 11, wherein the first compensation control signal includes a first phase control value for compensating for a rising time deviation between the feedback touch driving signal and the first feedback AC signal and a second phase control value for compensating for a rising time deviation between the feedback touch driving signal and the second feedback AC signal.

13. The method of claim 9, wherein the detecting of the amplitudes of the feedback touch driving signal, the first feedback AC signal, and the second feedback AC signal comprises:

clamping each of the feedback touch driving signal, the first feedback AC signal, and the second feedback AC signal in a positive direction;

downscaling an amplitude of the clamped signal;

converting the downscaled signal into an analog direct current (DC) voltage; and converting the analog DC voltage into a digital DC voltage.

14. The method of claim 13, wherein the detecting of the amplitudes of the feedback touch driving signal, the first feedback AC signal, and the second feedback AC signal includes comparing the digital DC voltage of each of the feedback touch driving signal, the first feedback AC signal, and the second feedback AC signal with a reference value to output the second compensation control signal for compensating for the amplitude deviation.

* * * * *